(12) United States Patent
Liu et al.

(10) Patent No.: US 11,425,729 B2
(45) Date of Patent: Aug. 23, 2022

(54) REFERENCE SIGNAL TRANSMISSION METHOD AND COMMUNICATIONS DEVICE

(71) Applicant: Huawei Technologies Co., Ltd., Shenzhen (CN)

(72) Inventors: Yong Liu, Shanghai (CN); Xi Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 17/095,553

(22) Filed: Nov. 11, 2020

(65) Prior Publication Data

US 2021/0068116 A1 Mar. 4, 2021

Related U.S. Application Data

(63) Continuation of application No. PCT/CN2019/084722, filed on Apr. 28, 2019.

(30) Foreign Application Priority Data

May 11, 2018 (CN) .......................... 201810450412.3

(51) Int. Cl.
*H04W 72/04* (2009.01)
*H04L 5/00* (2006.01)
*H04B 7/06* (2006.01)

(52) U.S. Cl.
CPC ...... *H04W 72/0493* (2013.01); *H04B 7/0626* (2013.01); *H04L 5/0051* (2013.01);
(Continued)

(58) Field of Classification Search
CPC ......... H04W 72/0493; H04W 72/0453; H04W 72/042; H04L 5/0051
See application file for complete search history.

(56) References Cited

U.S. PATENT DOCUMENTS

2014/0050163 A1 2/2014 Mccoy
2016/0127095 A1 5/2016 Chen et al.
(Continued)

FOREIGN PATENT DOCUMENTS

CN 101778068 A 7/2010
CN 103095431 A 5/2013
(Continued)

OTHER PUBLICATIONS

"Wider Bandwidth Operations," 3GPP TSG RAN WG1 NR Ad-Hoc#2, R1-1710761, Qingdao, P.R. China, XP051304372, Total 8 pages, 3rd Generation Partnership Project, Valbonne, France (Jun. 27-30, 2017).

(Continued)

*Primary Examiner* — Kevin C. Harper
*Assistant Examiner* — Henry Baron
(74) *Attorney, Agent, or Firm* — Leydig, Voit & Mayer, Ltd.

(57) ABSTRACT

A reference signal transmission method and a communications device are described. The method includes determining, by a first communications device, a first frequency band based on a first initial resource index, a second initial resource index, a first configured bandwidth, and a second configured bandwidth. The first initial resource index is greater than or equal to the second initial resource index, and the first initial resource index is less than or equal to a sum of the second initial resource index and the second configured bandwidth. The method further includes receiving, by the first communications device, a reference signal on the first frequency band. When this application is implemented, an actual transmission bandwidth of the reference signal can be accurately determined.

24 Claims, 15 Drawing Sheets

(52) U.S. Cl.
CPC ......... *H04L 5/0092* (2013.01); *H04W 72/042* (2013.01); *H04W 72/0453* (2013.01)

(56) References Cited

U.S. PATENT DOCUMENTS

| | | | |
|---|---|---|---|
| 2016/0337874 | A1 | 11/2016 | Yang et al. |
| 2017/0215097 | A1 | 7/2017 | Park et al. |
| 2019/0268185 | A1* | 8/2019 | Wang ..................... H04B 1/713 |
| 2020/0177353 | A1 | 6/2020 | Ding et al. |
| 2020/0213161 | A1* | 7/2020 | Zhang .................. H04W 80/08 |

FOREIGN PATENT DOCUMENTS

| | | |
|---|---|---|
| CN | 107911203 A | 4/2018 |
| WO | 2015101150 A1 | 7/2015 |
| WO | 2016021993 A2 | 2/2016 |

OTHER PUBLICATIONS

"Session Notes for Agenda Item 7.1.2," 3GPP TSG RAN WG1 Meeting #92bis, R1-1805711, Sanya, China, XP051435672, Total 27 pages, 3rd Generation Partnership Project, Valbonne, France (Apr. 16-20, 2018).

"Overview of wider bandwidth operations," 3GPP TSG RAN WG1 NR Ad Hoc Meeting, R1-1709972, Qingdao, China, XP051304712, Total 9 pages, 3rd Generation Partnership Project, Valbonne, France (Jun. 27-30, 2017).

"Remaining issues on CSI-RS #2", 3GPP TSG RAN WG1 Meeting #92bis, R1-1805685, Sanya, China, Apr. 16-20, 2018, total 10 pages.

"3rd Generation Partnership Project; Technical Specification Group Radio Access Network; Evolved Universal Terrestrial Radio Access (E-UTRA); Physical layer procedures (Release 15)," 3GPP TS 36.213 V15.1.0, pp. 1-501, 3rd Generation Partnership Project, Valbonne, France (Mar. 2018).

"3rd Generation Partnership Project; Technical Specification Group Radio Access Network; NR; Physical channels and modulation (Release 15)," 3GPP TS 38.211 V15.1.0, pp. 1-90, 3rd Generation Partnership Project, Valbonne, France (Mar. 2018).

"Remaining details on CSI-RS design in NR," 3GPP TSG RAN WG1 Meeting #92bis, Sanya, China, R1-1803638, pp. 1-3, 3rd Generation Partnership Project, Valbonne, France (Apr. 16-20, 2018).

"3rd Generation Partnership Project; Technical Specification Group Radio Access Network; NR; Physical channels and modulation (Release 15)," 3GPP TS 38.211 V15.0.0, pp. 1-73, 3rd Generation Partnership Project, Valbonne, France (Dec. 2017).

"3rd Generation Partnership Project; Technical Specification Group Radio Access Network; NR; Physical layer procedures for data (Release 15)," 3GPP TS 38.214 V15.1.0, pp. 1-77, 3rd Generation Partnership Project, Valbonne, France (Mar. 2018).

"Remaining details on CSI-RS design in NR," 3GPP TSG RAN WG1 Meeting #93, Busan, Korea, R1-1805957, pp. 1-5, 3rd Generation Partnership Project, Valbonne, France (May 21-25, 2018).

"3rd Generation Partnership Project; Technical Specification Group Radio Access Network; NR; Physical layer procedures for data (Release 15)," 3GPP TS 38.214 V15.0.0, pp. 1-71, 3rd Generation Partnership Project, Valbonne, France (Dec. 2017).

"3rd Generation Partnership Project; Technical Specification Group Radio Access Network; NR; Radio Resource Control (RRC) protocol specification (Release 15)," 3GPP TS 38.331 V15.1.0, pp. 1-268, 3rd Generation Partnership Project, Valbonne, France (Mar. 2018).

* cited by examiner

REFERENCE SIGNAL TRANSMISSION METHOD AND COMMUNICATIONS DEVICE

CROSS-REFERENCE TO RELATED APPLICATIONS

This application is a continuation of International Application No. PCT/CN2019/084722, filed on Apr. 28, 2019, which claims priority to Chinese Patent Application No. 201810450412.3, filed on May 11, 2018. The disclosures of the aforementioned applications are hereby incorporated by reference in their entireties.

TECHNICAL FIELD

This application relates to the field of communications technologies, and in particular, to a reference signal transmission method and a communications device.

BACKGROUND

In a long term evolution (LTE) system, a channel state information-reference signal (CSI-RS) is transmitted on a full frequency band. To implement more flexible CSI-RS bandwidth configuration, the new radio (NR) Release 15 (R15) already supports transmission of the CSI-RS on a bandwidth part (Bandwidth Part, BWP). To ensure that a receive-end device can learn of the bandwidth part on which the CSI-RS is transmitted, a transmit-end device needs to send configuration parameters of the bandwidth part to the receive-end device, so that the receive-end device can determine, based on the configuration parameters, a frequency domain resource used for transmitting the CSI-RS. The configuration parameters of the bandwidth part include an initial resource block (RB) index and a configured bandwidth (that is, a quantity of RBs occupied by the bandwidth).

An existing protocol specifies that if a configured bandwidth is greater than a corresponding bandwidth part (BWP), a terminal device (user equipment, UE) shall assume that an actual CSI-RS bandwidth is equal to a size of the BWP.

If UE determines, according to the existing protocol, a CSI-RS bandwidth configured by a base station for the UE, an error occurs in some scenarios. Therefore, existing protocol definitions have a defect, and consequently, an actual transmission bandwidth of the reference signal cannot be accurately determined.

SUMMARY

Embodiments of this application provide a reference signal transmission method and a communications device, so that an actual transmission bandwidth of a reference signal can be accurately determined.

According to a first aspect, an embodiment of this application provides a reference signal transmission method, applied to a first communications device side. The method includes: determining, by a first communications device, a first frequency band based on a first initial resource index, a second initial resource index, a first configured bandwidth, and a second configured bandwidth, where the first initial resource index is greater than or equal to the second initial resource index, and the first initial resource index is less than or equal to a sum of the second initial resource index and the second configured bandwidth; and receiving, by the first communications device, a reference signal on the first frequency band.

According to a second aspect, an embodiment of this application provides a reference signal transmission method, applied to a second communications device side. The method includes: determining, by a second communications device, a first frequency band based on a first initial resource index, a second initial resource index, a first configured bandwidth, and a second configured bandwidth, where the first initial resource index is greater than or equal to the second initial resource index, and the first initial resource index is less than or equal to a sum of the second initial resource index and the second configured bandwidth; and sending, by the second communications device, a reference signal on the first frequency band.

By implementing the method described in the first aspect or in the second aspect, a communications device can accurately determine an actual transmission bandwidth of the reference signal, avoiding that the first communications device incorrectly determines a transmit bandwidth of the reference signal, improving channel estimation performance of the reference signal, and thereby improving feedback or transmission precision.

With reference to the first aspect or the second aspect, in a possible design, if a sum of the first initial resource index and the first configured bandwidth is greater than or equal to the sum of the second initial resource index and the second configured bandwidth, the first frequency band meets the following condition: a bandwidth of the first frequency band=the second initial resource index+the second configured bandwidth−the first initial resource index.

With reference to the first aspect or the second aspect, in a possible design, if a sum of the first initial resource index and the first configured bandwidth is less than the sum of the second initial resource index and the second configured bandwidth, a bandwidth of the first frequency band is equal to the first configured bandwidth.

With reference to the first aspect or the second aspect, in a possible design, if a sum of the first initial resource index and the first configured bandwidth is greater than or equal to the sum of the second initial resource index and the second configured bandwidth, the first frequency band meets the following condition: a bandwidth of the first frequency band=n×⌊(the second initial resource index+the second configured bandwidth−the first initial resource index)÷n⌋, where n is a positive integer.

With reference to the first aspect or the second aspect, in a possible design, if a sum of the first initial resource index and the first configured bandwidth is less than the sum of the second initial resource index and the second configured bandwidth, a bandwidth of the first frequency band=n×⌊the first configured bandwidth÷n⌋, where n is a positive integer.

With reference to the first aspect or the second aspect, in a possible design, the first initial resource index is an index of a first initial resource in a second frequency band, the second initial resource index is an index of a second initial resource in the second frequency band, and the second frequency band is a frequency band including a resource corresponding to the second initial resource index to a resource corresponding to a result of subtracting 1 from the sum of the second initial resource index and the second configured bandwidth.

With reference to the first aspect or the second aspect, in a possible design, the first initial resource index is an index of a first initial resource in a third frequency band, the second initial resource index is an index of a second initial resource in the third frequency band, the third frequency band includes a second frequency band, and the second frequency band is a frequency band including a resource corresponding to the second initial resource index to a resource corresponding to a result of subtracting 1 from the sum of the second initial resource index and the second configured bandwidth.

With reference to the first aspect or the second aspect, in a possible design, the reference signal is a CSI-RS.

According to a third aspect, an embodiment of this application provides a communications device, where the communications device is a first communications device, and the first communications device may include a plurality of functional modules or units, configured to correspondingly perform the reference signal transmission method provided in the first aspect.

According to a fourth aspect, an embodiment of this application provides a communications device, where the communications device is a second communications device, and the second communications device may include a plurality of functional modules or units, configured to correspondingly perform the reference signal transmission method provided in the second aspect.

According to a fifth aspect, an embodiment of this application provides a communications device, where the communications device is a first communications device, used to perform the reference signal transmission method provided in the first aspect. The first communications device may include a memory, a processor, a transmitter, and a receiver, where the transmitter and the receiver are configured to communicate with another communications device (e.g., a second communications device), the memory is configured to store program code of the reference signal transmission method provided in the first aspect, and the processor is configured to execute program code stored in the memory, that is, perform the reference signal transmission method provided in the first aspect.

According to a sixth aspect, an embodiment of this application provides a communications device, where the communications device is a second communications device, used to perform the reference signal transmission method provided in the second aspect. The second communications device may include a memory, a processor, a transmitter, and a receiver, where the transmitter and the receiver are configured to communicate with another communications device (e.g., a first communications device), the memory is configured to store program code of the reference signal transmission method provided in the second aspect, and the processor is configured to execute program code stored in the memory, that is, perform the reference signal transmission method provided in the second aspect.

According to a seventh aspect, an embodiment of this application provides a communications system, where the communications system includes a first communications device and a second communications device, the first communications device may be the first communications device described in the third aspect, or may be the first communications device described in the fifth aspect, and the second communications device may be the second communications device described in the fourth aspect, or may be the second communications device described in the sixth aspect.

According to an eighth aspect, an embodiment of this application provides a communications chip, where the communications chip may include a processor and one or more interfaces coupled to the processor, the processor may be configured to invoke, from a memory, a program for implementing the reference signal transmission method provided in the first aspect, and execute an instruction included in the program, and the interfaces may be configured to output a data processing result of the processor.

According to a ninth aspect, an embodiment of this application provides a communications chip, where the communications chip may include a processor and one or more interfaces coupled to the processor, the processor may be configured to invoke, from a memory, a program for implementing the reference signal transmission method provided in the second aspect, and execute an instruction included in the program, and the interfaces may be configured to output a data processing result of the processor.

According to a tenth aspect, an embodiment of this application provides a computer readable storage medium, where the readable storage medium stores an instruction, and when run on a processor, the instruction enables the processor to perform the reference signal transmission method described in the first aspect.

According to an eleventh aspect, an embodiment of this application provides a computer readable storage medium, where the readable storage medium stores an instruction, and when run on a processor, the instruction enables the processor to perform the reference signal transmission method described in the second aspect.

According to a twelfth aspect, an embodiment of this application provides a computer program product including an instruction, where when run on a processor, the instruction enables the processor to perform the reference signal transmission method described in the first aspect.

According to a thirteenth aspect, an embodiment of this application provides a computer program product including an instruction, where when run on a processor, the instruction enables the processor to perform the reference signal transmission method described in the second aspect.

BRIEF DESCRIPTION OF DRAWINGS

To describe the technical solutions in embodiments of this application or in the background more clearly, the following describes the accompanying drawings required for describing the embodiments of this application or the background.

DESCRIPTION OF EMBODIMENTS

Terms used in the DESCRIPTION OF EMBODIMENTS part of this application is used only to explain the specific embodiments of this application, and is not intended to limit this application.

Figure 1:
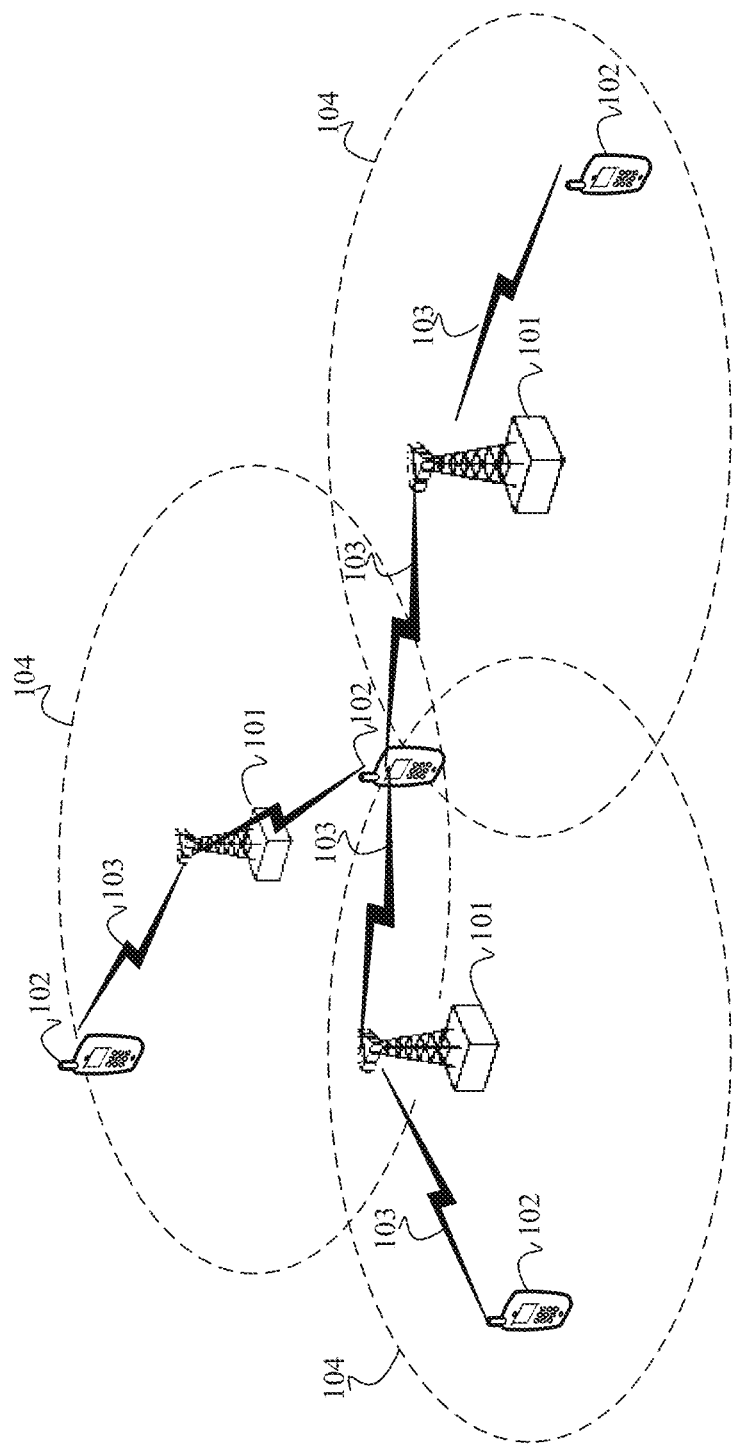
FIG. 1 is a schematic architectural diagram of a wireless communications system according to an embodiment of this application.

FIG. 1 shows a wireless communications system in an embodiment of this application. The wireless communications system 100 may operate on a licensed frequency band, or may operate on an unlicensed frequency band. The wireless communications system 100 is not limited to a long term evolution (LTE) system, and may alternatively be a future evolved 5G system, a new radio (NR) system, or the like. It can be understood that use of the unlicensed frequency band can increase a system capacity of the wireless communications system 100. As shown in FIG. 1, the wireless communications system 100 includes one or more network devices 101 and one or more terminal devices 102.

The network device 101 may perform wireless communication with the terminal device 102 using one or more antennas. Each network device 101 can provide communication coverage for a corresponding coverage area 104. The coverage area 104 corresponding to the network device 101 may be divided into a plurality of sectors (sector). One sector corresponds to a portion of the coverage area (not shown).

In this embodiment of this application, the network device 101 may include a base transceiver station, a wireless transceiver, a basic service set (BSS), an extended service set (ESS), a NodeB, an evolved NodeB (eNB or eNodeB), a next-generation node (next-generation Node B, gNB), or the like. The wireless communications system 100 may include different types of network devices 101, for example, a macro base station and a micro base station. The network device 101 may use different wireless technologies, for example, a cell radio access technology or a WLAN radio access technology.

The terminal device 102 may be distributed throughout the wireless communications system 100, and may be stationary or mobile. In this embodiment of this application, the terminal device 102 may include a mobile device, a mobile station, a mobile unit, a radio unit, a remote unit, a user agent, a mobile client, or the like.

In this application, the wireless communications system 100 may be a multi-beam communications system.

The network device 101 may be equipped with a large-scale antenna array, and control, using a beamforming technology, the antenna array to form beams of different directions. To cover an entire cell 104, the network device 101 needs to use a plurality of beams of different directions.

For example, in a downlink process, the network device 101 may transmit a radio signal (e.g., a downlink reference signal (RS) and/or a downlink synchronization signal block (SS block)) using beams of different directions sequentially. This process is referred to as beam scanning. Simultaneously, the terminal device 102 measures transmit beams to determine signal quality of a transmit beam that can be received by the terminal device 102. This process is referred to as beam measurement.

In a future communications system, the terminal device 102 may be also equipped with an antenna array, and may also change between different beams for signal reception and transmission. In other words, in the wireless communications system 100, both the network device 101 and the terminal device 102 may use a plurality of beams for communication.

In this embodiment of this application, the wireless communications system 100 may support a multi-carrier (waveform signals with different frequencies) operation. A multi-carrier transmitter may transmit a modulated signal simultaneously on a plurality of carriers. For example, each communications connection 103 may bear multi-carrier signals modulated using different wireless technologies. Each modulated signal may be sent on different carriers, and may also carry control information (e.g., a reference signal, or control channel information), overhead information, data, and the like.

In this embodiment of this application, the network device 101 sends a channel state information-reference signal (CSI-RS) to the terminal device 102 for measuring channel state information (CSI) by the terminal device 102. The CSI includes one or more of a rank indication (RI), a precoding matrix indication (PMI), and a channel quality indicator (CQI). The terminal device 102 feeds back the CSI to the network device 101. The CSI fed back by the terminal device 102 includes one or more of the PMI, the RI, and the CQI. The PMI is used for the network device 101 to determine a precoding matrix. The RI is used for recommending a quantity of layers of data to be sent by the network device 101 to the terminal device 102 on a same time-frequency resource. The CQI assists the network device 101 in determining a modulation and coding scheme, to improve transmission reliability and efficiency. Then, when sending downlink data to the terminal device 102, the network device 101 may perform precoding processing on the downlink data using a precoding matrix determined based on the PMI or using a precoding matrix determined based on the PMI and other information.

Figure 2A:
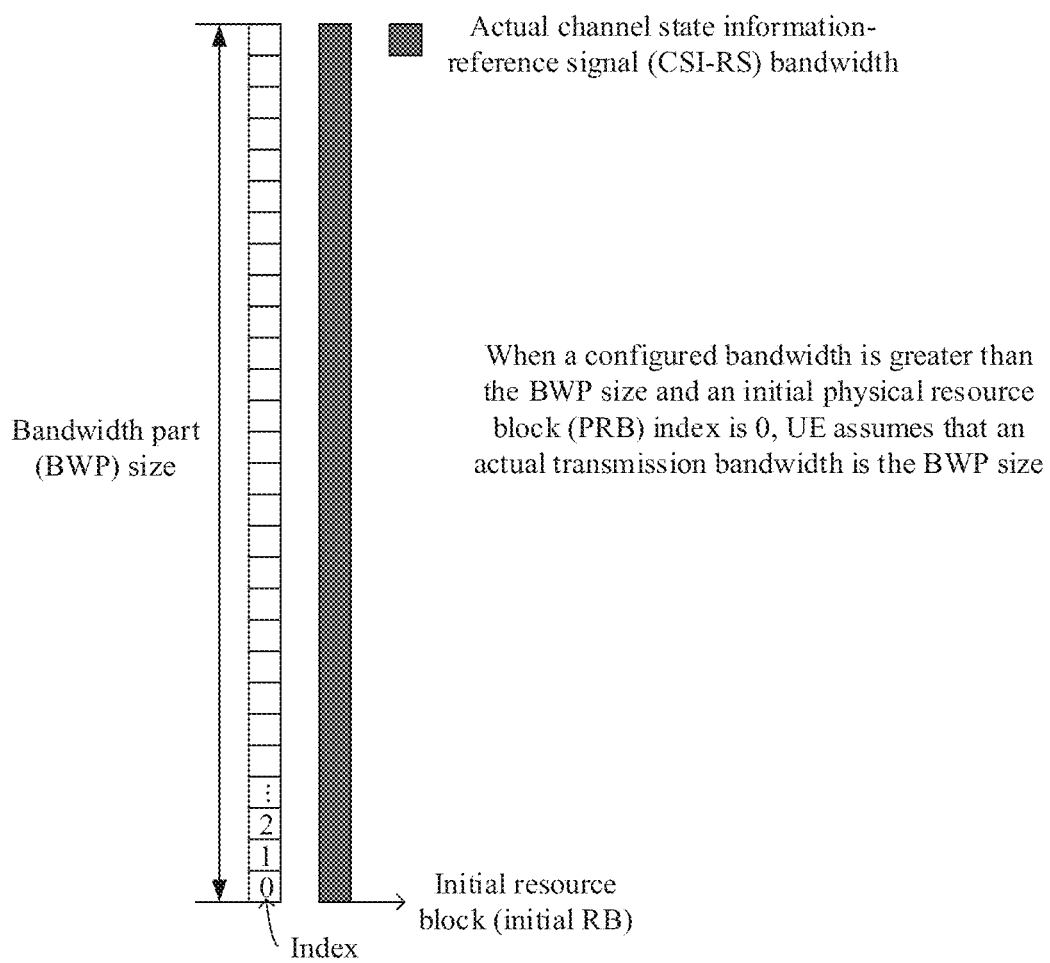
FIG. 2A is a schematic diagram of a scenario of determining a configured bandwidth of a CSI-RS according to an embodiment of this application.
Figure 2B:
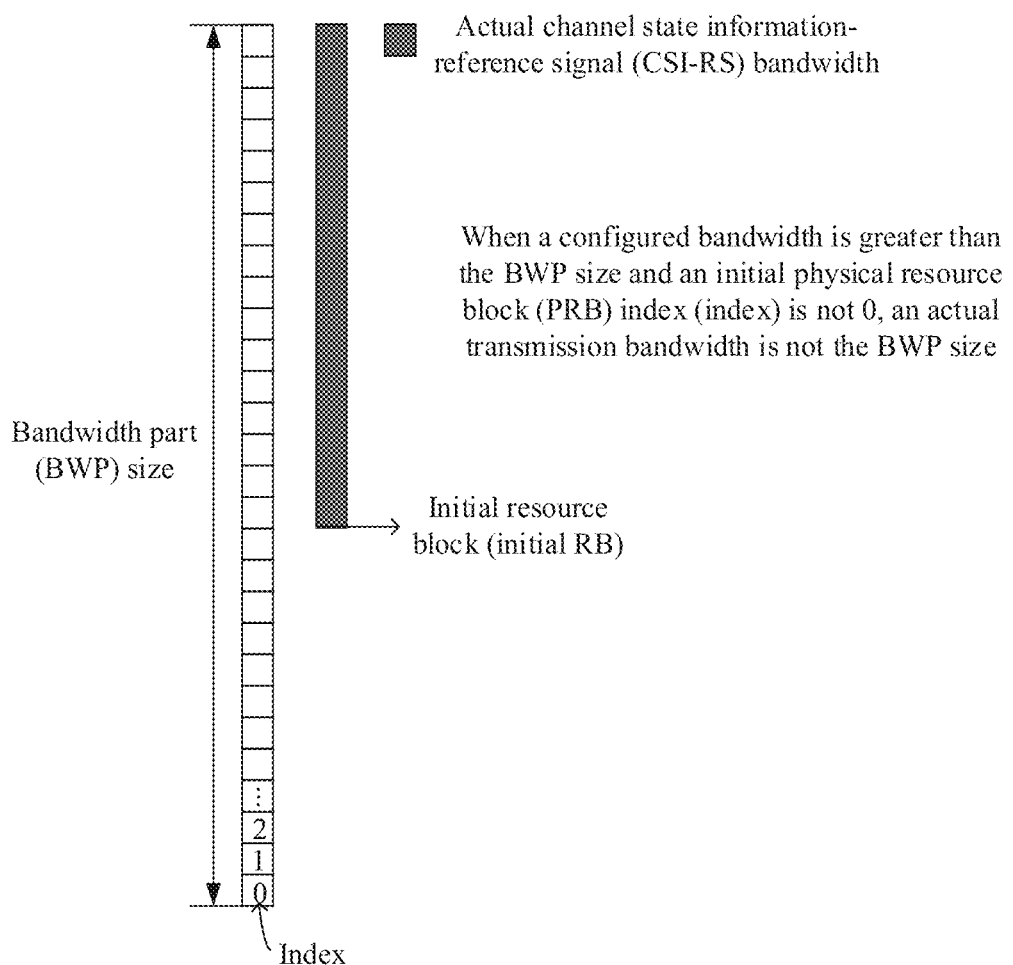
FIG. 2B is a schematic diagram of another scenario of determining a configured bandwidth of a CSI-RS according to an embodiment of this application.

In an existing protocol, the network device 101 needs to inform the terminal device 102 of at least two parameters: an initial resource block (RB) index and a configured bandwidth (that is, a quantity of RBs occupied by a bandwidth). The terminal device 102 calculates, based on the two parameters, a bandwidth of a frequency band used for transmission of the CSI-RS. If the terminal device 102 calculates the bandwidth of the frequency band of the CSI-RS according to the existing protocol, an error occurs in some scenarios. For example, referring to FIG. 2A, when a bandwidth configured by the network device 101 is greater than a BWP size and an initial physical resource block (PRB) index is 0, that is, when physical resource blocks configured for the CSI-RS start from a BWP PRB 0, the current protocol is reasonable, that is, the terminal device 102 assumes that an actual transmission bandwidth is the BWP size. Referring to FIG. 2B, when a configured bandwidth is greater than a BWP size and an initial PRB index is not 0, that is, when physical resource blocks configured for the CSI-RS do not start from a BWP PRB 0, the current protocol is unreasonable. It is impossible that an actual transmission bandwidth of the CSI-RS is the BWP size, and the terminal device 102 cannot assume that the actual transmission bandwidth of the CSI-RS is the BWP size. In this case, to improve reception performance of a terminal device, a more precise formula needs to be used for calculating the actual transmission bandwidth of the CSI-RS. A manner of calculating the actual transmission bandwidth of the CSI-RS is described in detail in the following method embodiments.

Figure 3:
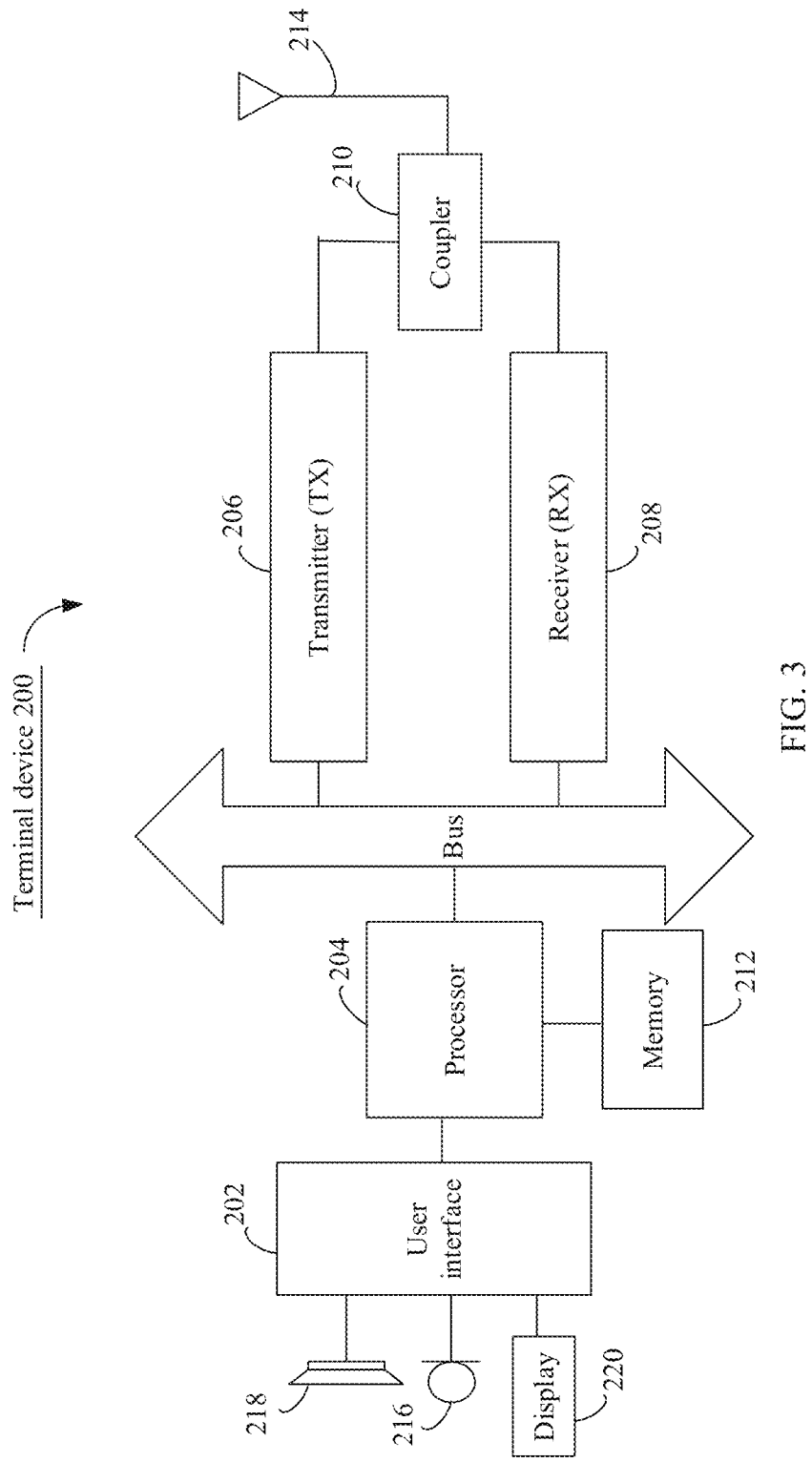
FIG. 3 is a schematic diagram of a hardware architecture of a terminal device according to one of embodiments of this application.

FIG. 3 shows a terminal device provided in an embodiment of this application. As shown in FIG. 3, the terminal device 200 may include an input and output module (including an audio input and output module 218, a key input module 216, a display 220, and the like), a user interface 202, one or more processors 204, a transmitter 206, a receiver 208, a coupler 210, an antenna 214, and a memory 212. These components may be connected through a bus or in another manner. In FIG. 3, for example, these components are connected through a bus.

The antenna 214 may be configured to convert electromagnetic energy into an electromagnetic wave in free space, or convert an electromagnetic wave in free space into electromagnetic energy in a transmission line. The coupler 210 is configured to split a mobile communication signal received by the antenna 214 into a plurality of signals, and allocate the plurality of signals to a plurality of receivers 208.

The transmitter 206 may be configured to perform transmission processing on a signal output by the processor 204.

The receiver 208 may be configured to perform reception processing on a mobile communication signal received by the antenna 214.

In this embodiment of this application, the transmitter 206 and the receiver 208 may be considered as a wireless modem. In the terminal device 200, there may be one or more transmitters 206 and one or more receivers 208.

In addition to the transmitter 206 and the receiver 208 shown in FIG. 3, the terminal device 200 may further include another communications component, for example, a GPS module, a bluetooth (Bluetooth) module, or a wireless fidelity (Wi-Fi) module. Not limited to the above-described wireless communication signal, the terminal device 200 may further support another wireless communication signal, for example, a satellite signal or a shortwave signal. In addition to wireless communication, the terminal device 200 may be further equipped with a wired network interface (e.g., a LAN interface) 201 to support wired communication.

The input and output module may be configured to implement interaction between the terminal device 200 and a user/an external environment, and may mainly include the audio input and output module 218, the key input module 216, the display 220, and the like. Specifically, the input and output module may further include a camera, a touchscreen, a sensor, and the like. All the components of the input and output module communicates with the processor 204 through the user interface 202.

The memory 212 may be coupled to the processor 204 through the bus or an input and output port, and the memory 212 may be alternatively integrated with the processor 204.

The memory 212 is configured to store various software programs and/or a plurality of groups of instructions. Specifically, the memory 212 may include a high-speed random access memory, and may also include a nonvolatile memory, for example, one or more magnetic disk storage devices, a flash memory device, or another nonvolatile solid-state storage device. The memory 212 may store an operating system (hereinafter referred to as a system), for example, an embedded operating system such as Android, iOS, Windows, or Linux. The memory 212 may further store a network communication program, where the network communication program may be configured to communicate with one or more accessorial devices, one or more terminal devices, and one or more network devices. The memory 212 may further store a user interface program, where the user interface program may vividly display content of an application program through a graphical operation interface, and receive a user control operation on the application program using input controls such as a menu, a dialog box, and a key.

In this embodiment of this application, the memory 212 may be configured to store a program for implementing, on a terminal device 200 side, a reference signal transmission method provided in one or more embodiments of this application. For implementation of the reference signal transmission method provided in one or more embodiments of this application, refer to a subsequent embodiment.

The processor 204 may be configured to read and execute a computer readable instruction. Specifically, the processor 204 may be configured to invoke a program stored in the memory 212, for example, the program for implementing, on the terminal device 200 side, the reference signal transmission method provided in one or more embodiments of this application, and execute an instruction included in the program to implement the method in a subsequent embodiment. The processor 204 may support one or more of global system for mobile communications (GSM) (2G) communication, wideband code division multiple access (WCDMA) (3G) communication, long term evolution (LTE) (4G) communication, 5G communication, and the like. Optionally, when the processor 204 sends any message or data, the processor 204 performs the sending specifically by driving or controlling the transmitter 206. Optionally, when the processor 204 receives any message or data, the processor 204 performs the reception specifically by driving or controlling the receiver 208. Therefore, the processor 204 may be considered as a control center for performing sending or reception, and the transmitter 206 and the receiver 208 are specific executors of sending and reception operations.

It can be understood that the terminal device 200 may be the terminal device 102 in the wireless communications system 100 shown in FIG. 1, and may be implemented as a mobile device, a mobile station, a mobile unit, a radio unit, a remote unit, a user agent, a mobile client, or the like.

It should be noted that the terminal device 200 shown in FIG. 3 is merely an implementation of the embodiments of this application, and in actual application, the terminal device 200 may further include more or fewer components. This is not limited herein.

Figure 4:
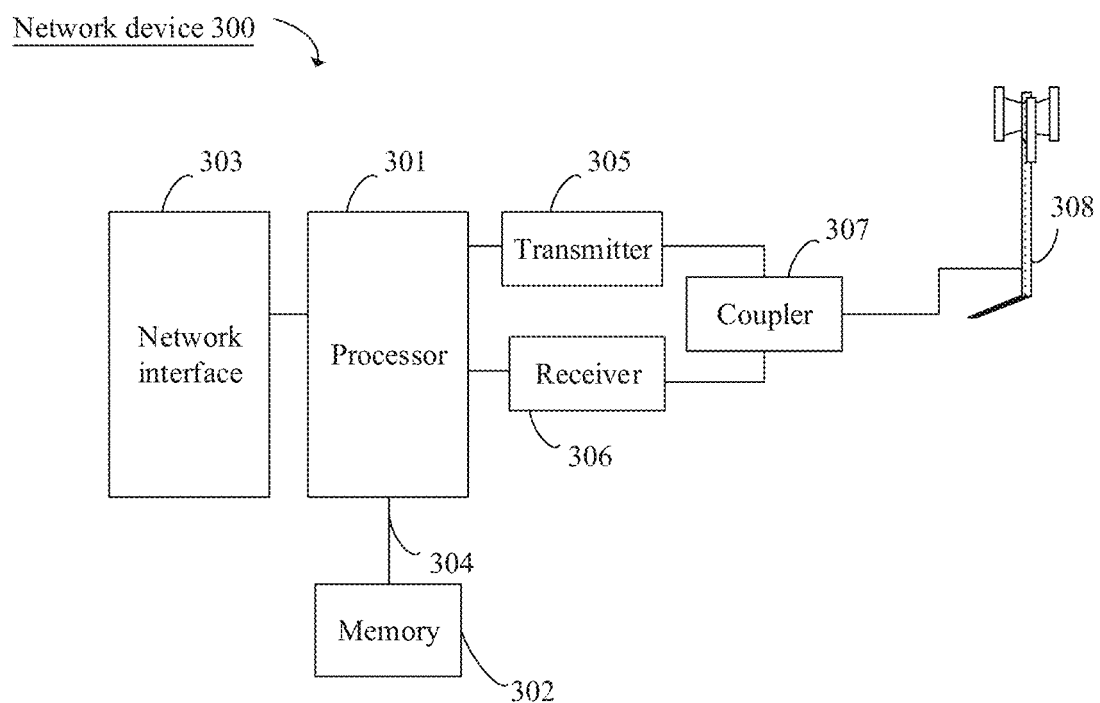
FIG. 4 is a schematic diagram of a hardware architecture of a network device according to one of embodiments of this application.

FIG. 4 shows a network device provided in an embodiment of this application. As shown in FIG. 4, the network device 300 may include one or more processors 301, a memory 302, a network interface 303, a transmitter 305, a receiver 306, a coupler 307, and an antenna 308. These components may be connected through a bus 304 or in another manner. In FIG. 4, for example, these components are connected through the bus 304.

The network interface 303 may be used by the network device 300 for communicating with another communications device, for example, another network device. Specifically, the network interface 303 may be a wired interface.

The transmitter 305 may be configured to perform transmission processing, for example, signal modulation, on a signal output by the processor 301. The receiver 306 may be configured to perform reception processing, for example, signal demodulation, on a mobile communication signal received by the antenna 308. In some embodiments of this application, the transmitter 305 and the receiver 306 may be considered as a wireless modem. In the network device 300, there may be one or more transmitters 305 and one or more receivers 306. The antenna 308 may be configured to convert electromagnetic energy in a transmission line into an electromagnetic wave in free space, or convert an electromagnetic wave in free space into electromagnetic energy in a transmission line. The coupler 307 may be configured to split a mobile communication signal into a plurality of signals, and allocate the plurality of signals to a plurality of receivers 306.

The memory 302 may be coupled to the processor 301 through the bus 304 or an input and output port, and the memory 302 may be alternatively integrated with the processor 301. The memory 302 is configured to store various software programs and/or a plurality of groups of instructions. Specifically, the memory 302 may include a high-speed random access memory, and may also include a nonvolatile memory, for example, one or more magnetic disk storage devices, a flash memory device, or another nonvolatile solid-state storage device. The memory 302 may store an operating system (hereinafter referred to as a system), for example, an embedded operating system such as uCOS, VxWorks, or RTLinux. The memory 302 may further store a network communication program, where the network communication program may be configured to communicate with one or more accessorial devices, one or more terminal devices, and one or more network devices.

The processor 301 may be configured to perform radio channel management, calling implementation, and communications link establishment and disconnecting, and provide cell handover control and the like for a user in a local control area. Specifically, the processor 301 may include an administration module/communication module (AM/CM) (used as a speech channel switching and information switching center), a basic module (BM) (used to perform functions of call processing, signaling processing, radio resource management, radio link management, and circuit maintenance), a transcoder and submultiplexer unit (TCSM) (used to perform functions of multiplexing, demultiplexing, and transcoding), and the like.

In this embodiment of this application, the processor 301 may be configured to read and execute a computer readable instruction. Specifically, the processor 301 may be configured to invoke a program stored in the memory 302, for example, a program for implementing, on a network device 300 side, a reference signal transmission method provided in one or more embodiments of this application, and execute an instruction included in the program.

It can be understood that the network device 300 may be the network device 101 in the wireless communications system 100 shown in FIG. 1, and may be implemented as a base transceiver station, a wireless transceiver, a basic service set (BSS), an extended service set (ESS), a nodeB, an eNodeB, a gNB, or the like.

It should be noted that the network device 300 shown in FIG. 4 is merely an implementation of the embodiments of this application, and in actual application, the network device 300 may further include more or fewer components. This is not limited herein.

It should be noted that a first communications device described in the following embodiments may be the foregoing terminal device, and a second communications device described in the following embodiments may be the foregoing network device, or a first communications device described in the following embodiments may be the foregoing network device, and a second communications device described in the following embodiments may be the foregoing terminal device.

Figure 5:
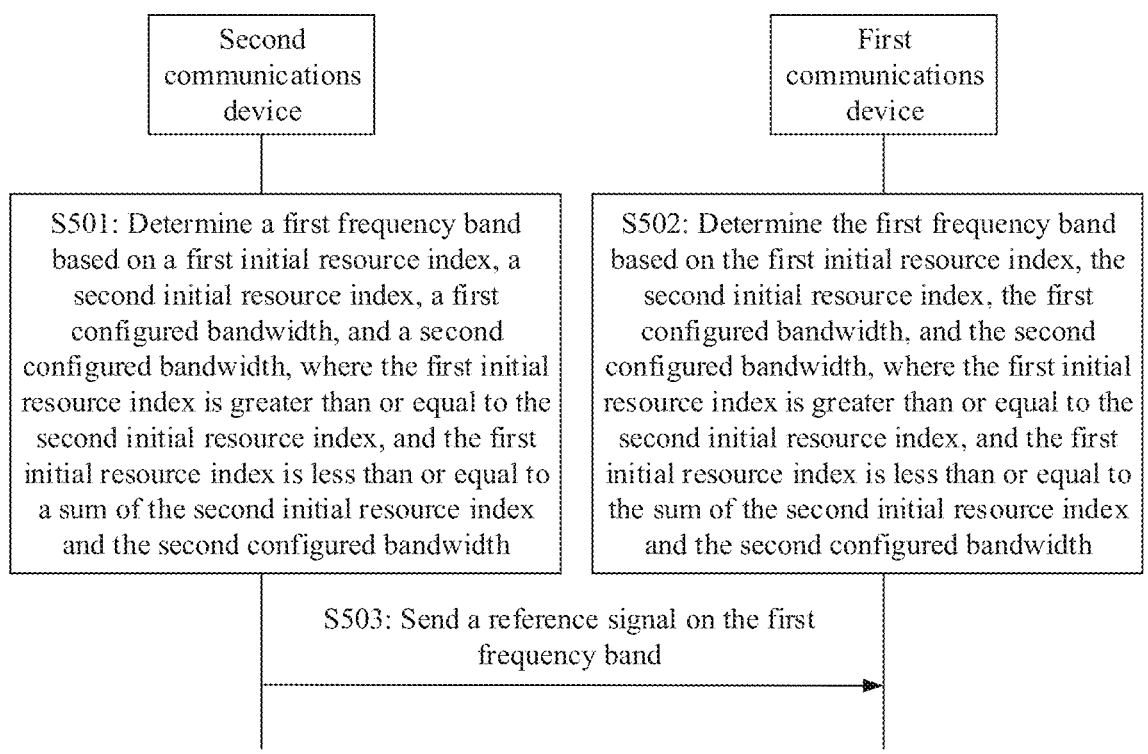
FIG. 5 is a schematic flowchart of a reference signal transmission method according to an embodiment of the present application.

Based on the embodiments corresponding to the wireless communications system 100, the terminal device 200, and the network device 300, an embodiment of this application provides a reference signal transmission method. Referring to FIG. 5, the reference signal transmission method includes but is not limited to the following steps.

S501: A second communications device determines a first frequency band based on a first initial resource index, a second initial resource index, a first configured bandwidth, and a second configured bandwidth, where the first initial resource index is greater than or equal to the second initial resource index, and the first initial resource index is less than or equal to a sum of the second initial resource index and the second configured bandwidth.

Figure 6:
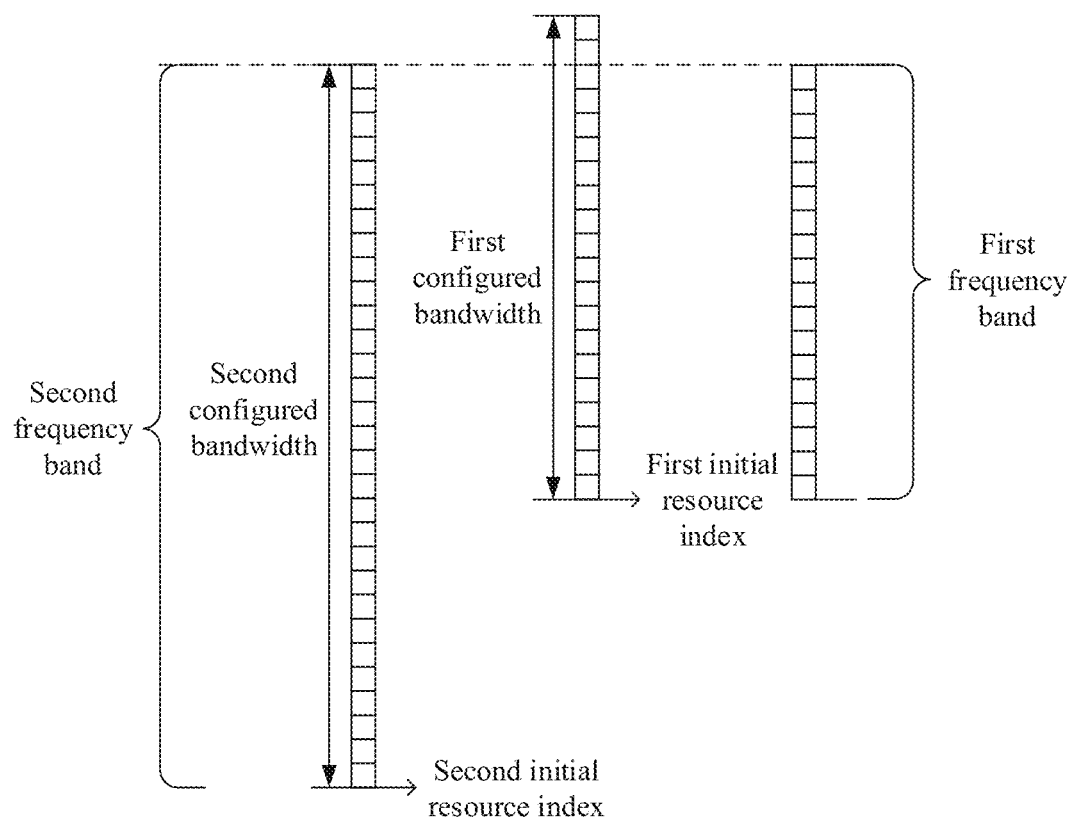
FIG. 6 is a schematic diagram of a configuration manner of a first transmission resource according to an embodiment of this application.

FIG. 6 is a schematic diagram of a configuration manner of a first frequency band provided in an embodiment of this application. In FIG. 6, a second frequency band is a frequency domain resource configured by a network device for a terminal device in advance, and the second configured bandwidth is a size (or width) of the second frequency band, for example, 10 MHz or 20 MHz. The second frequency band may be a BWP, or may be a common carrier (CC). This application uses an example in which the second frequency band is the BWP for description. The network device may configure a plurality of frequency domain resources for the terminal device in advance, and indicate, to the terminal device using signaling, a specific frequency domain resource or specific frequency domain resources of the plurality of frequency domain resources that is or are to be used for current communication. For example, the network device may configure three BWPs (e.g., perform the configuration using radio resource control (RRC) signaling) for the terminal device in advance, namely, a BWP 0, a BWP 1, and a BWP 2. The BWP 0 includes 30 RBs, and may correspond indexes 0 to 29. The BWP 1 includes 30 RBs, and may correspond indexes 30 to 59. The BWP 2 includes 21 RBs, and may correspond indexes 60 to 80.

Optionally, before step S501, the network device may instruct, using downlink control information (DCI), media access control (MAC) signaling or RRC signaling, the terminal device to use the BWP 1 to communicate with the network device. Alternatively, the network device and the terminal device use a default or protocol-defined second frequency band for communication, and no network signaling is needed for instructing. In this case, the second frequency band in FIG. 6 may be understood as the BWP 1, and the second configured bandwidth may be understood as a bandwidth size of the BWP 1, that is, 30.

The second initial resource index is an index of an initial resource in the second frequency band. The initial resource may be understood as a resource with a lowest frequency or a resource with a minimum index in the second frequency band. All indexes described in the embodiments of this application are indexes in frequency domain. For example, if the second frequency band is the BWP 1, the second initial resource index is 30.

Correspondingly, when FIG. 6 is used as an example, for the second frequency band, the second initial resource index is 30, and the size is 30 RBs.

It should be noted that in addition to being expressed in a quantity of RBs, the size of the second frequency band may be alternatively expressed in a quantity of resource block groups (RBG), for example, 30 RBGs, where one RBG may include one or more RBs, or may be expressed in a quantity of subcarriers, for example, 120 subcarriers, where one RB may include a plurality of subcarriers, or the like. Correspondingly, the second initial resource index may be alternatively expressed in RGB 30 or subcarrier 30. This is not specifically limited in this application. In this embodiment of this application, an example in which the size of the second frequency band is expressed in a quantity of RBs is used for description.

The first configured bandwidth is a bandwidth that is configured by the network device for the terminal device and that is used for transmission of a reference signal. The reference signal may include but is not limited to a CSI-RS. The first initial resource index is an index of an initial resource that is configured by the network device for the terminal device and that is used for transmission of the reference signal. Similar to the second configured bandwidth, the first configured bandwidth may be expressed in a quantity of RBs, or in a quantity of RBGs, or in a quantity of subcarriers. Correspondingly, similar to the second initial resource index, the first initial resource index may be an RB index, an RBG index, a subcarrier index, or the like. This is not limited in this application. Optionally, a minimum value of the first configured bandwidth may be equal to min (m, the second configured bandwidth), where m is a positive integer. For example, when m is 24, and the second configured bandwidth is equal to 30, the minimum value of the first configured bandwidth is 24 RBs.

It should be noted that the first initial resource index may be equal to the second initial resource index, or may be greater than the second initial resource index. The first initial resource index is less than or equal to an index of a resource with a largest index in the second frequency band, or the first initial resource index is less than or equal to a result of subtracting 1 from the sum of the second initial resource index and the second configured bandwidth. In other words, a resource corresponding to the first initial resource index needs to be within a range of the second frequency band. A size of the first configured bandwidth may be equal to a size of the second configured bandwidth, or may be greater than or less than a size of the second configured bandwidth.

Optionally, before step S501, the network device sends the first initial resource index and the first configured bandwidth to the terminal device using signaling. For example, the network device may send the first initial resource index and the first configured bandwidth to the terminal device using RRC signaling, MAC layer signaling, or physical layer signaling. The network device may send the first initial resource index and the first configured bandwidth using a same piece of signaling or different pieces of signaling. This is not limited in this application.

In FIG. 6, the first frequency band is a calculated frequency band actually used for transmission of the reference signal.

The NR Rel-15 standard specifies that both a first configured bandwidth configured by a network device and a first initial resource index are expressed in a unit of four RBs. However, a BWP bandwidth is expressed in a unit of one RB. Therefore, a partial resource corresponding to the first configured bandwidth configured by the network device may exceed the range of the second frequency band. For example, in FIG. 6, assuming that the second frequency band is the BWP 1, that is, the second configured bandwidth is equal to 30, and that the first configured bandwidth is equal to 20, two RBs corresponding to the first configured bandwidth are not within the range of the second frequency band. In this case, to improve reception performance of the terminal device, it is necessary to calculate a bandwidth actually used for transmission of the reference signal, that is, a bandwidth of the first frequency band.

In an implementation, if a sum of the first initial resource index and the first configured bandwidth is greater than or equal to the sum of the second initial resource index and the second configured bandwidth, the first frequency band meets the following condition: the bandwidth of the first frequency band=the second initial resource index+the second configured bandwidth−the first initial resource index. In other words, an initial resource index of the first frequency band is the first initial resource index, and an ending resource index of the first frequency band is (the second initial resource index+the second configured bandwidth−1). The ending resource index of the first frequency band is an index corresponding to a resource with a largest index in the first frequency band.

It should be noted that the foregoing determining condition or formula and/or the foregoing condition met by the first frequency band may have any variant, and the any variant may be considered as meeting the foregoing determining condition or formula and/or the foregoing condition met by the first frequency band, provided that the any variant can be finally converted into the foregoing determining condition or formula and/or the foregoing condition met by the first frequency band. For example, if a result of subtracting 1 from the sum of the first initial resource index and the first configured bandwidth is greater than or equal to the result of subtracting 1 from the sum of the second initial resource index and the second configured bandwidth, the first frequency band meets the following condition: the bandwidth of the first frequency band=the second initial resource index+the second configured bandwidth−the first initial resource index.

For example, referring to FIG. 6, assuming that the second frequency band is the BWP 1, a second initial resource is an RB 30, the second initial resource index is 30, and the second configured bandwidth is 30. A first initial resource is an RB 42, the first initial resource index is 42, and the first configured bandwidth is 20. In this case, 42+20>30+30. Therefore, the bandwidth of the first frequency band=30+30−42=18. The initial resource index of the first frequency band is 42, and a size of the first frequency band is 18 RBs; or the initial resource index of the first frequency band is 42, and the ending resource index of the first frequency band is 59.

Figure 7:
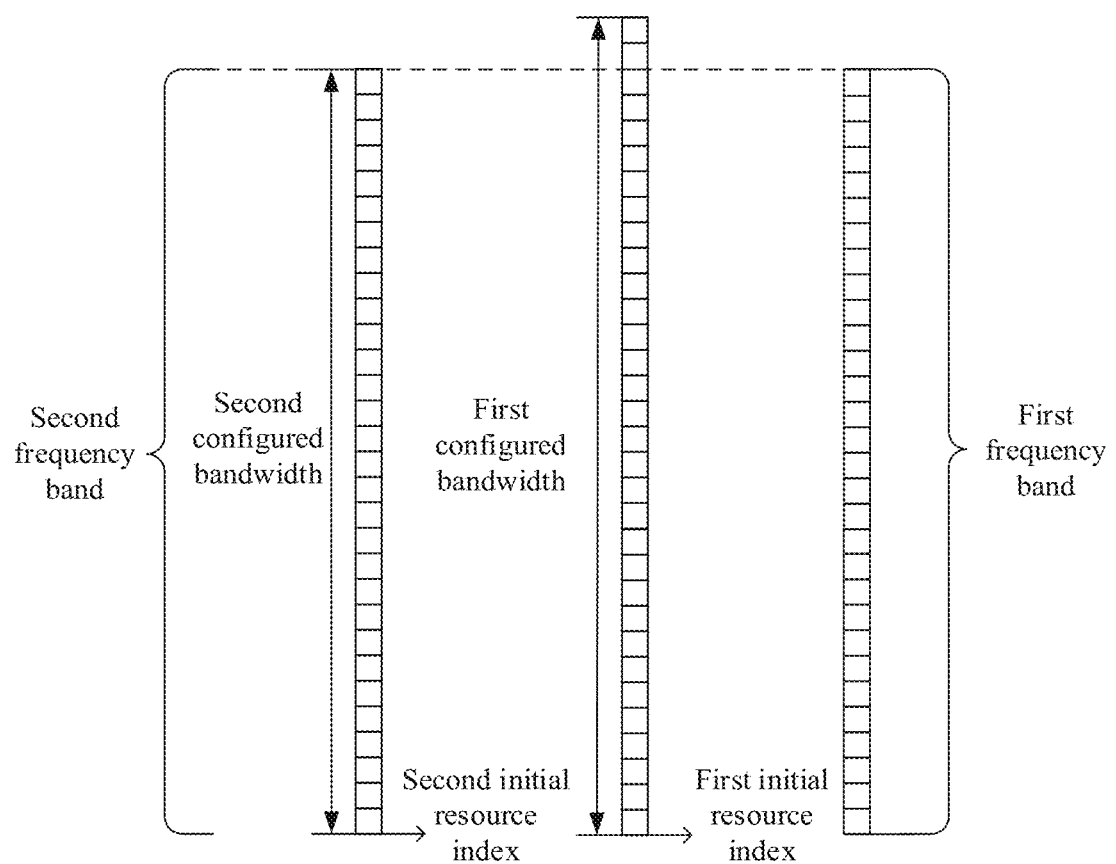
FIG. 7 is a schematic diagram of another configuration manner of a first transmission resource according to an embodiment of this application.

FIG. 6 provides a description by using an example in which the first initial resource index is greater than the second initial resource index. With reference to FIG. 7, the following describes a configuration manner of the first frequency band in a case in which the first initial resource index is equal to the second initial resource index. Referring to FIG. 7, assuming that the second frequency band is the BWP 1, a second initial resource is an RB 30, the second initial resource index is 30, and the second configured bandwidth is 30. The first initial resource index is 30, and the first configured bandwidth is 32. In this case, 30+32>30+30.

Therefore, the bandwidth of the first frequency band=30+ 30−30=30. The initial resource index of the first frequency band is 30, and a size of the first frequency band is 30 RBs; or the initial resource index of the first frequency band is 30, and the ending resource index of the first frequency band is 59.

In another implementation, if a sum of the first initial resource index and the first configured bandwidth is less than the sum of the second initial resource index and the second configured bandwidth, the bandwidth of the first frequency band is equal to the first configured bandwidth. In other words, an initial resource index of the first frequency band is the first initial resource index, and an ending resource index of the first frequency band is (the first configured bandwidth+the first initial resource index−1).

Figure 8:
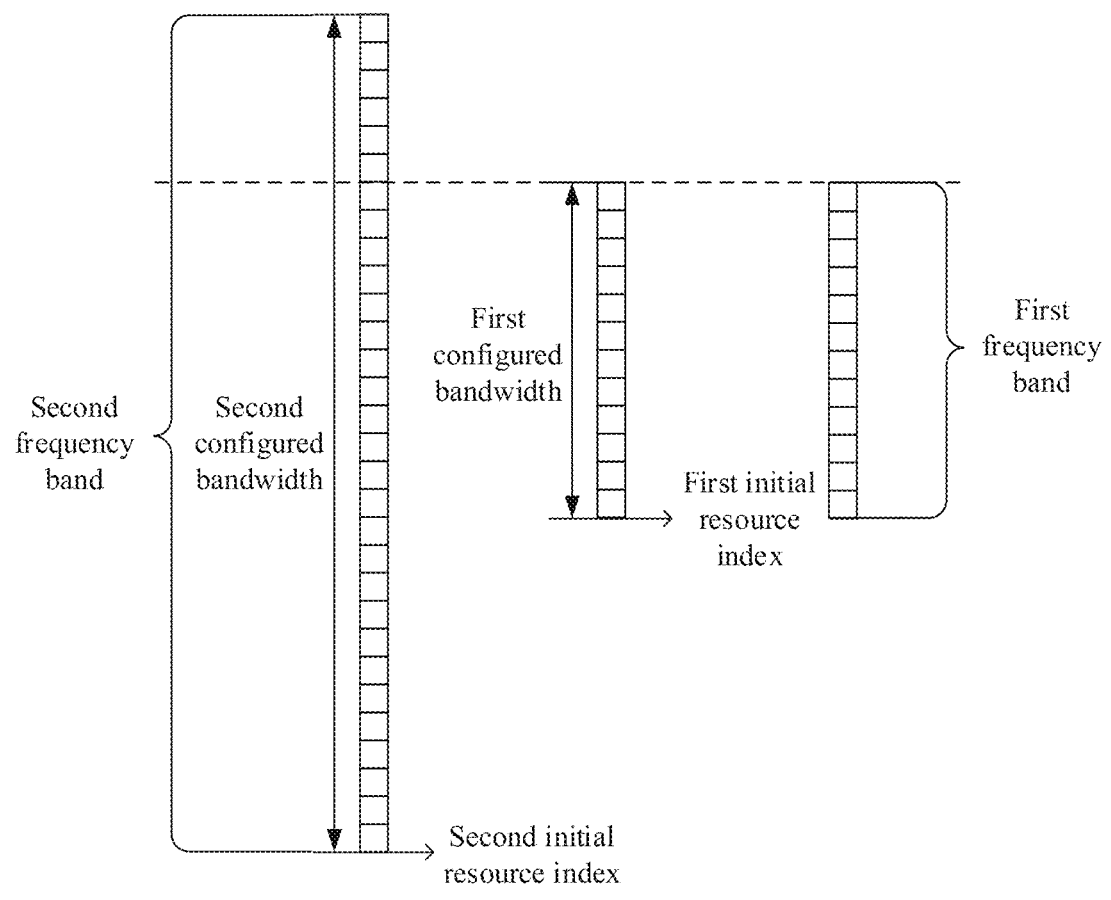
FIG. 8 is a schematic diagram of another configuration manner of a first transmission resource according to an embodiment of this application.

For example, referring to FIG. 8, assuming that the second frequency band is the BWP 1, a second initial resource is an RB 30, the second initial resource index is 30, and the second configured bandwidth is 30. A first initial resource is an RB 42, the first initial resource index is 42, and the first configured bandwidth is 12. In this case, 42+12<30+30. Therefore, the bandwidth of the first frequency band=12. The initial resource index of the first frequency band is 42, and a size of the first frequency band is 12 RBs; or the initial resource index of the first frequency band is 42, and the ending resource index of the first frequency band is 53.

Figure 9:
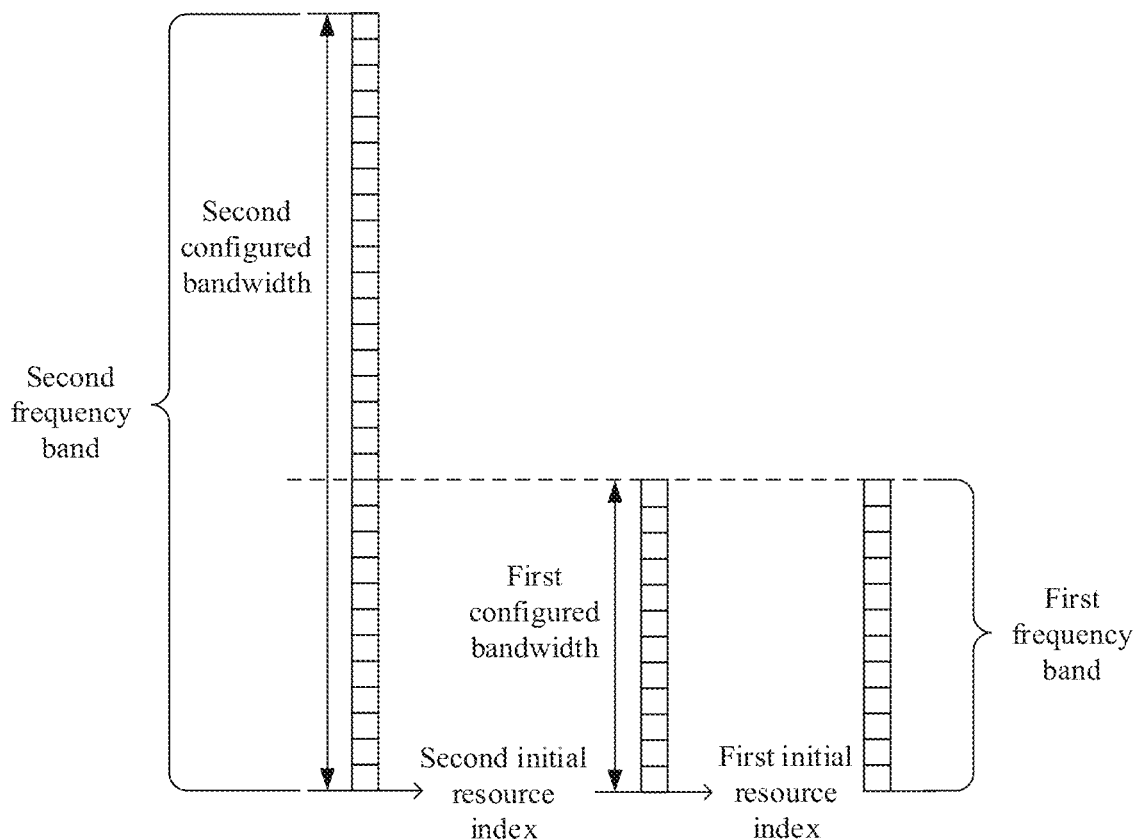
FIG. 9 is a schematic diagram of another configuration manner of a first transmission resource according to an embodiment of this application.

FIG. 8 provides a description by using an example in which the first initial resource index is greater than the second initial resource index. With reference to FIG. 9, the following describes a configuration manner of the first frequency band in a case in which the first initial resource index is equal to the second initial resource index. Referring to FIG. 9, assuming that the second frequency band is the BWP 1, a second initial resource is an RB 30, the second initial resource index is 30, and the second configured bandwidth is 30. The first initial resource index is 30, and the first configured bandwidth is 12. In this case, 30+12<30+30. Therefore, the bandwidth of the first frequency band=12. The initial resource index of the first frequency band is 30, and a size of the first frequency band is 12 RBs; or the initial resource index of the first frequency band is 30, and the ending resource index of the first frequency band is 41.

Figure 10:
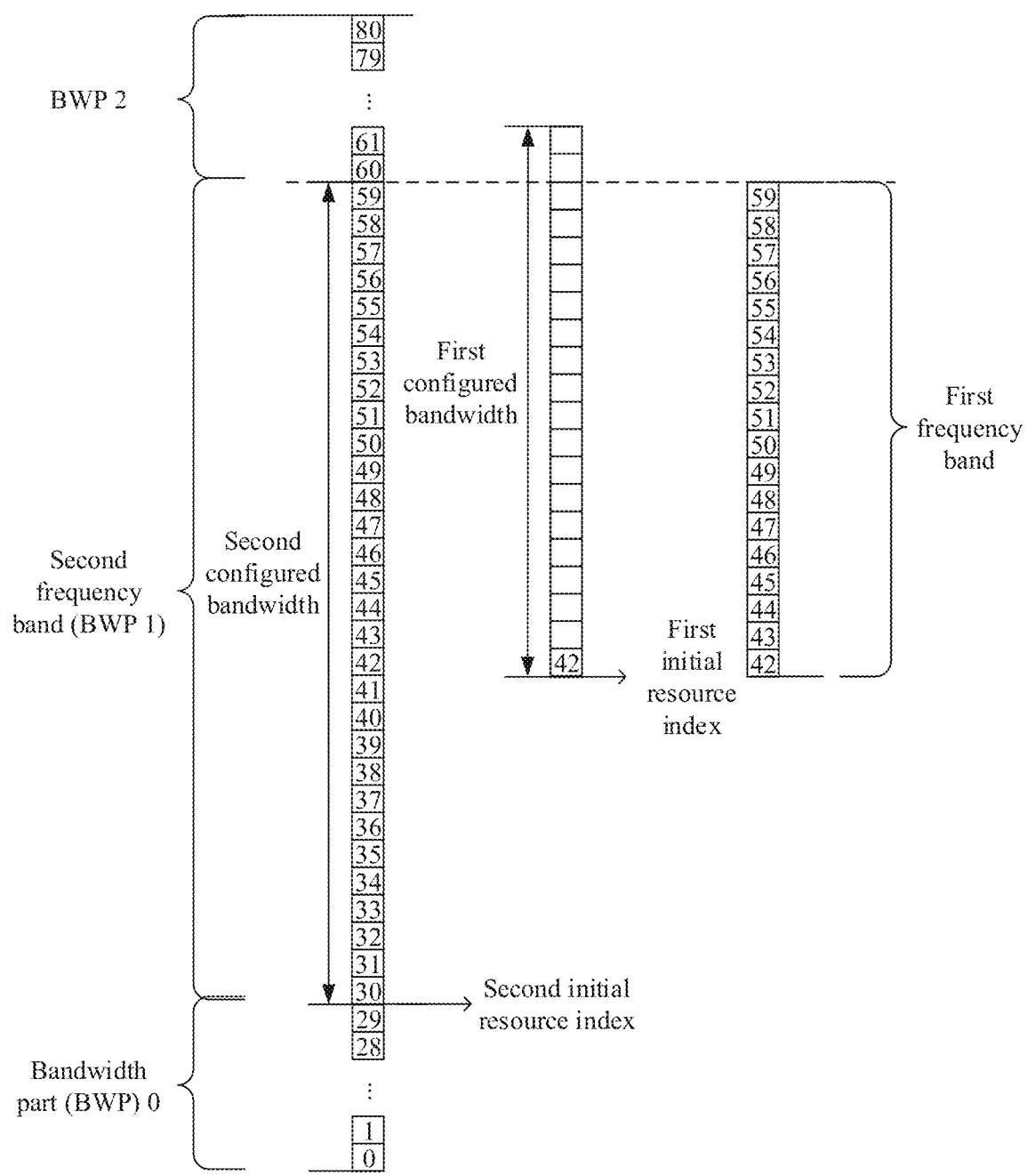
FIG. 10 is a schematic diagram of another configuration manner of a first transmission resource according to an embodiment of this application.

In the foregoing several examples, an example in which an initial resource occupies an index of a full frequency band is used for both the first initial resource index and the second initial resource index. For a schematic diagram of a full frequency band indexing manner, refer to FIG. 10. Resources in different BWPs are indexed together throughout the full frequency band. A bandwidth of the full frequency band may be configured by the network device using RRC signaling, MAC layer signaling, or physical layer signaling, or may be specified in a protocol. When the bandwidth the full frequency band is configured by the network device using RRC signaling, the RRC signaling may be system information or a dedicated RRC message. This is not limited in this application. For example, the bandwidth of the full frequency band is 100 GHz or 20 GHz. The full frequency band includes the second frequency band. In this case, an RB may be alternatively referred to as a common resource block (CRB) in the full frequency band, and an RB index may be alternatively referred to as a CRB index. Therefore, the first initial resource index and the second initial resource index may be represented by a CRB index. For example, in FIG. 10, the second initial resource index is CRB 30, that is, the second initial resource index is equal to 30. The full frequency band may be replaced by a third frequency band. The third frequency band includes the second frequency band. In other words, resources of the third frequency band include a resource of the second frequency band, and may further include a resource outside the second frequency band. For example, in FIG. 10, the full frequency band not only includes the second frequency band BWP 1 but also includes the BWP 0 and the BWP 2 in addition to the BWP 1.

Figure 11:
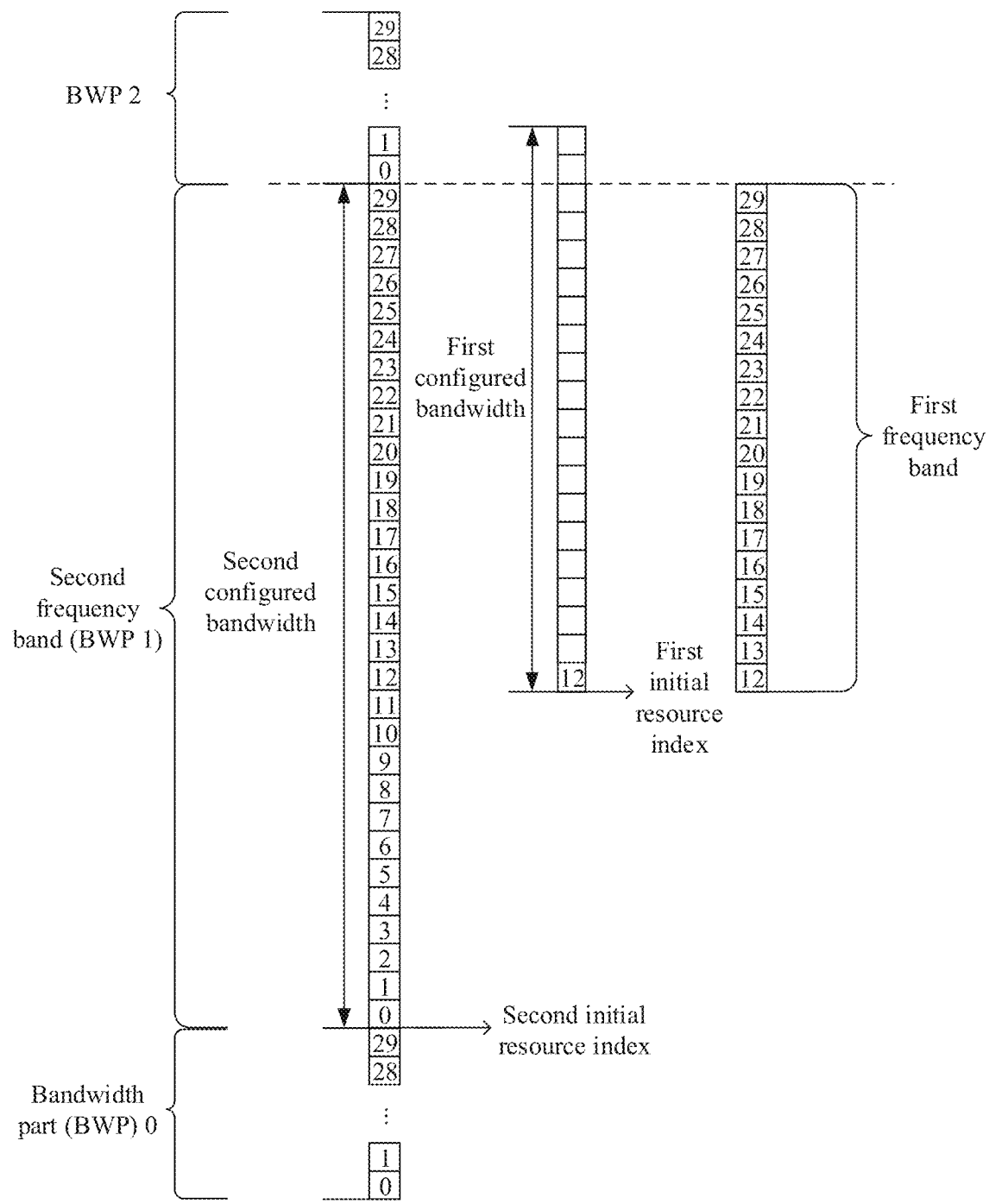
FIG. 11 is a schematic diagram of another configuration manner of a first transmission resource according to an embodiment of this application.

In addition, the first initial resource index and the second initial resource index may be alternatively calculated based on an index within a single BWP. For a schematic diagram of a single BWP indexing manner, refer to FIG. 11. Resources in a BWP are indexed only within the BWP. In this case, an RB may be also referred to as a physical resource block (PRB) in a bandwidth of a BWP, and an RB index may be also referred to as a PRB index. Therefore, the first initial resource index and the second initial resource index may be represented by a PRB index. For example, in FIG. 11, the second initial resource index is PRB 0, that is, the second initial resource index is equal to 0. A bandwidth of one RB may be, for example, 12 contiguous subcarriers in frequency domain.

In the implementations shown in FIG. 6 to FIG. 11, the bandwidth of the first frequency band is determined based on one minimum resource unit (e.g., one RB, one RBG, or one subcarrier). Optionally, the bandwidth of the first frequency band may be alternatively configured based on n minimum resource units (e.g., n RBs, n RBGs, or n subcarriers), where n is a positive integer. A value of n may match a size of a resource scheduling granularity, a size of a CSI feedback granularity, or a subband (sub-band) size. For example, to ensure flexibility in CSI configuration reporting, the value of n may be a minimum subband size.

In an implementation, if a sum of the first initial resource index and the first configured bandwidth is greater than or equal to the sum of the second initial resource index and the second configured bandwidth, the first frequency band meets the following condition: the bandwidth of the first frequency band=n×⌊(the second initial resource index+the second configured bandwidth−the first initial resource index)÷n⌋, where ⌊ ⌋ represents rounding down, and n is a positive integer.

Figure 12:
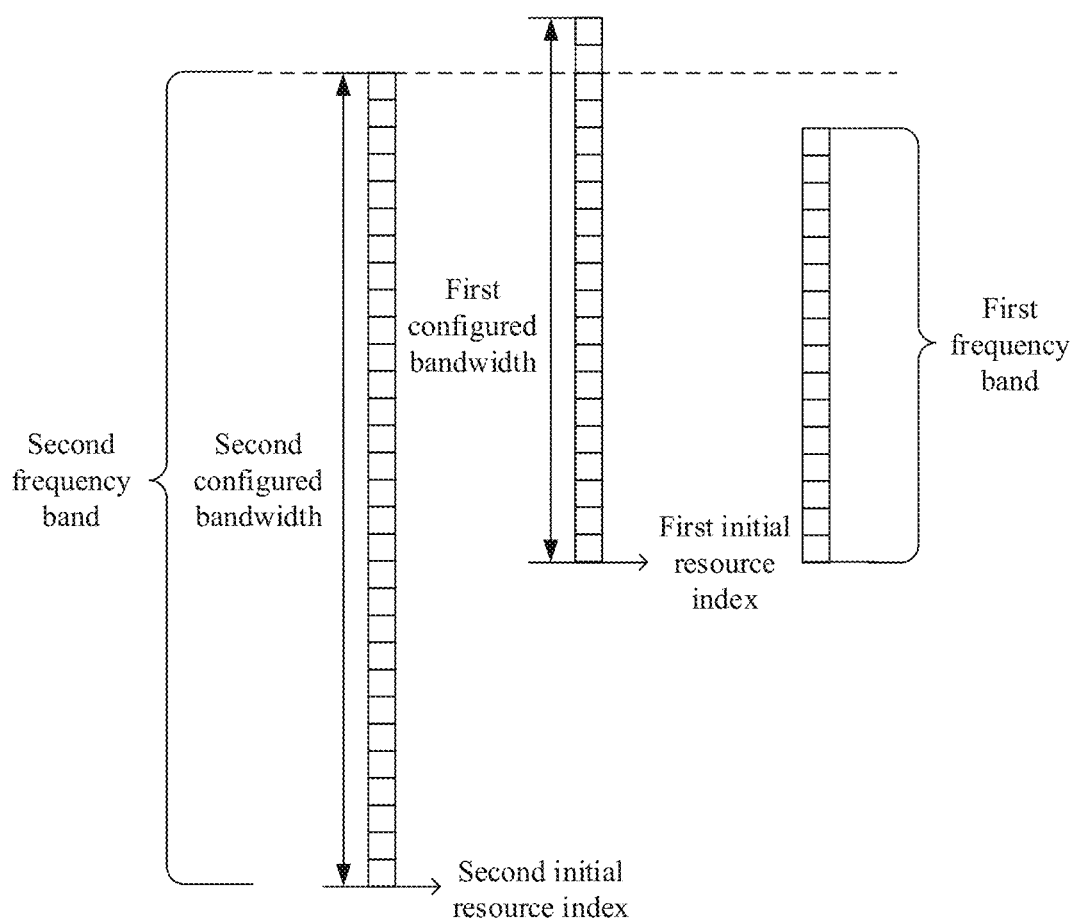
FIG. 12 is a schematic diagram of another configuration manner of a first transmission resource according to an embodiment of this application.

For example, n=4. Referring to FIG. 12, assuming that the second frequency band is the BWP 1, a second initial resource is an RB 30, the second initial resource index is 30, and the second configured bandwidth is 30. A first initial resource is an RB 42, the first initial resource index is 42, and the first configured bandwidth is 20. In this case, 42+20>30+30. Therefore, the bandwidth of the first frequency band=4×⌊(30+30−42)÷4⌋=16. The initial resource index of the first frequency band is 42, and a size of the first frequency band is 16 RBs; or the initial resource index of the first frequency band is 42, and the ending resource index of the first frequency band is 57.

In another implementation, if a sum of the first initial resource index and the first configured bandwidth is less than the sum of the second initial resource index and the second configured bandwidth, the bandwidth of the first frequency band=n×⌊the first configured bandwidth÷n⌋, where n is a positive integer.

Figure 13:
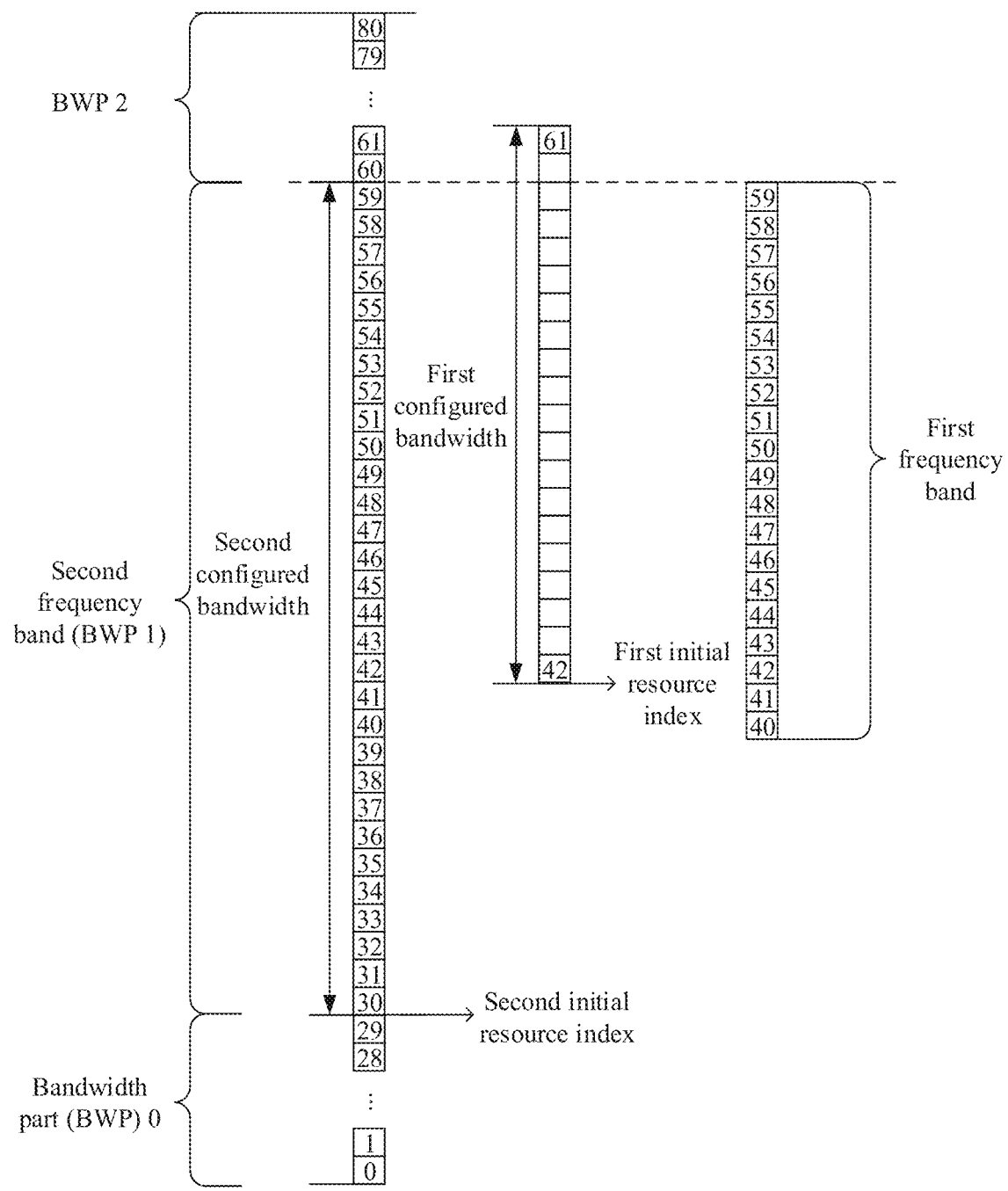
FIG. 13 is a schematic diagram of another configuration manner of a first transmission resource according to an embodiment of this application.

For example, n=4. Referring to FIG. 13, assuming that the second frequency band is the BWP 1, a second initial resource is an RB 30, the second initial resource index is 30, and the second configured bandwidth is 30. A first initial resource is an RB 42, the first initial resource index is 42, and the first configured bandwidth is 12. In this case, 42+12<30+30. Therefore, the bandwidth of the first frequency band=4×⌊12÷4⌋=12. The initial resource index of the first frequency band is 42, and a size of the first frequency band is 12 RBs; or the initial resource index of the first frequency band is 42, and the ending resource index of the first frequency band is 53.

In another implementation, if a sum of the first initial resource index and the first configured bandwidth is greater than or equal to the sum of the second initial resource index and the second configured bandwidth, and the first configured bandwidth is less than or equal to the second configured bandwidth, the first frequency band meets the following condition: the bandwidth of the first frequency band=the first configured bandwidth, and an initial resource index of the first frequency band=the first initial resource index−(an ending resource index of the first configured bandwidth−an ending resource index of the second configured bandwidth). It should be noted that in this implementation, a resource index is an index that is provided based on the full frequency band. For example, referring to FIG. 13, assuming that the second frequency band is the BWP 1, a second initial resource is an RB 30, the second initial resource index is 30, and the second configured bandwidth is 30. A first initial resource is an RB 42, the first initial resource index is 42, and the first configured bandwidth is 20. In this case, 42+20>30+30, and 20<30. Therefore, the bandwidth of the first frequency band=20. The initial resource index of the first frequency band is 42−(61−59)=40, and a size of the first frequency band is 20 RBs; or the initial resource index of the first frequency band is 40, and the ending resource index of the first frequency band is 59.

Optionally, the reference signal may be an uplink reference signal, or may be a downlink reference signal. The reference signal includes but is not limited to the CSI-RS, a sounding reference signal (SRS), and a demodulation reference signal (DMRS).

S502: A first communications device determines the first frequency band based on the first initial resource index, the second initial resource index, the first configured bandwidth, and the second configured bandwidth, where the first initial resource index is greater than or equal to the second initial resource index, and the first initial resource index is less than or equal to the sum of the second initial resource index and the second configured bandwidth.

For a manner of determining, by the first communications device, the first frequency band based on the first initial resource index, the second initial resource index, the first configured bandwidth, and the second configured bandwidth, refer to a manner of determining, by the second communications device, the first frequency band based on the first initial resource index, the second initial resource index, the first configured bandwidth, and the second configured bandwidth. Details are not described herein again.

It should be noted that there is no chronological order for steps S501 and S502.

S503: The second communications device sends the reference signal on the first frequency band, and the first communications device receives the reference signal on the first frequency band.

In this embodiment of this application, after calculating the first frequency band according to the foregoing embodiment, the second communications device sends the reference signal on the first frequency band. For example, because the initial resource index of the first frequency band=the first initial resource index, and the bandwidth of the first frequency band=the second initial resource index+the second configured bandwidth−the first initial resource index, the second communications device sends the reference signal within a segment of resources of $[N_1, N_2]$, where $N_1$ represents a resource corresponding to the first initial resource index, and $N_2$ represents a resource whose index=the second initial resource index+the second configured bandwidth−1.

Correspondingly, after calculating the first frequency band according to the foregoing embodiment, the first communications device receives the reference signal on the first frequency band. For example, because the initial resource index of the first frequency band=the first initial resource index, and the bandwidth of the first frequency band=the second initial resource index+the second configured bandwidth−the first initial resource index, the first communications device receives the reference signal within the segment of resources of $[N_1, N_2]$, where $N_1$ represents the resource corresponding to the first initial resource index, and $N_2$ represents the resource whose index=the second initial resource index+the second configured bandwidth−1.

When this embodiment of this application is implemented, a defect in existing protocol definitions can be resolved, so that a receive-end device can accurately calculate an actual transmission bandwidth of the reference signal, avoiding that the first communications device incorrectly determines a size of a transmit bandwidth of the reference signal, improving channel estimation performance of the reference signal, and thereby improving feedback or transmission precision and improving communications performance.

Figure 14:
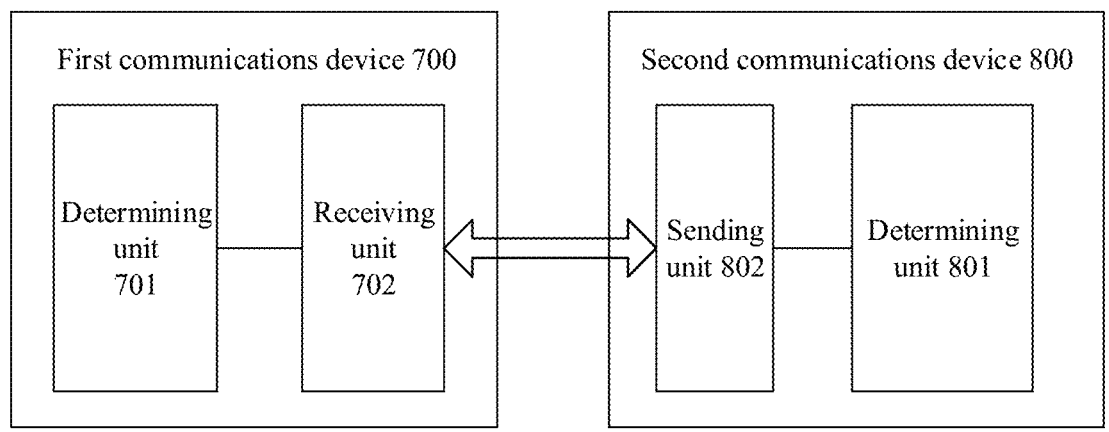
FIG. 14 is a functional block diagram of a wireless communications system, a first communications device, and a second communications device according to an embodiment of this application.

FIG. 14 shows a wireless communications system, a first communications device, and a second communications device provided in this application. The wireless communications system 600 includes the first communications device 700 and the second communications device 800. The first communications device 700 may be the network device 101 or the terminal device 102 in the embodiment shown in FIG. 1, and correspondingly, the second communications device 800 may be the terminal device 102 or the network device 101 in the embodiment shown in FIG. 1. The wireless communications system 600 may be the wireless communications system 100 described in FIG. 1. The first communications device 700 and the second communications device 800 are separately described below.

As shown in FIG. 14, the first communications device 700 may include a determining unit 701 and a receiving unit 702, where the determining unit 701 is configured to determine a first frequency band based on a first initial resource index, a second initial resource index, a first configured bandwidth, and a second configured bandwidth, where the first initial resource index is greater than or equal to the second initial resource index, and the first initial resource index is less than or equal to a sum of the second initial resource index and the second configured bandwidth; and the receiving unit 702 is configured to receive a reference signal on the first frequency band.

Optionally, if a sum of the first initial resource index and the first configured bandwidth is greater than or equal to the sum of the second initial resource index and the second configured bandwidth, the first frequency band meets the following condition: a bandwidth of the first frequency band=the second initial resource index+the second configured bandwidth−the first initial resource index.

Optionally, if a sum of the first initial resource index and the first configured bandwidth is less than the sum of the second initial resource index and the second configured bandwidth, a bandwidth of the first frequency band is equal to the first configured bandwidth.

Optionally, if a sum of the first initial resource index and the first configured bandwidth is greater than or equal to the sum of the second initial resource index and the second configured bandwidth, the first frequency band meets the following condition: a bandwidth of the first frequency band=n×⌊(the second initial resource index+the second configured bandwidth−the first initial resource index)÷n⌋, where n is a positive integer.

Optionally, if a sum of the first initial resource index and the first configured bandwidth is less than the sum of the second initial resource index and the second configured bandwidth, a bandwidth of the first frequency band=n×⌊the first configured bandwidth÷n⌋, where n is a positive integer.

Optionally, the first initial resource index is an index of a first initial resource in a second frequency band, the second initial resource index is an index of a second initial resource in the second frequency band, and the second frequency band is a frequency band including a resource corresponding to the second initial resource index to a resource corresponding to a result of subtracting 1 from the sum of the second initial resource index and the second configured bandwidth.

Optionally, the full frequency band may be replaced by a third frequency band. The third frequency band includes the second frequency band. In other words, resources of the third frequency band include a resource of the second frequency band, and may further include a resource outside the second frequency band. The first initial resource index is an index of a first initial resource in the third frequency band, the second initial resource index is an index of a second initial resource in the third frequency band, and the second frequency band is a frequency band including a resource corresponding to the second initial resource index to a resource corresponding to a result of subtracting 1 from the sum of the second initial resource index and the second configured bandwidth.

Optionally, the reference signal is a channel state information-reference signal.

It can be understood that for specific implementation of functional units included in the first communications device 700, reference may be made to the foregoing embodiments, and details are not described herein again.

As shown in FIG. 14, the second communications device 800 may include a determining unit 801 and a sending unit 802, where the determining unit 801 is configured to determine a first frequency band based on a first initial resource index, a second initial resource index, a first configured bandwidth, and a second configured bandwidth, where the first initial resource index is greater than or equal to the second initial resource index, and the first initial resource index is less than or equal to a sum of the second initial resource index and the second configured bandwidth; and the sending unit 802 is configured to send a reference signal on the first frequency band.

Optionally, if a sum of the first initial resource index and the first configured bandwidth is greater than or equal to the sum of the second initial resource index and the second configured bandwidth, the first frequency band meets the following condition: a bandwidth of the first frequency band=the second initial resource index+the second configured bandwidth−the first initial resource index.

Optionally, if a sum of the first initial resource index and the first configured bandwidth is less than the sum of the second initial resource index and the second configured bandwidth, a bandwidth of the first frequency band is equal to the first configured bandwidth.

Optionally, if a sum of the first initial resource index and the first configured bandwidth is greater than or equal to the sum of the second initial resource index and the second configured bandwidth, the first frequency band meets the following condition: a bandwidth of the first frequency band=n×⌊(the second initial resource index+the second configured bandwidth−the first initial resource index)÷n⌋, where n is a positive integer.

Optionally, if a sum of the first initial resource index and the first configured bandwidth is less than the sum of the second initial resource index and the second configured bandwidth, a bandwidth of the first frequency band=n×⌊the first configured bandwidth÷n⌋, where n is a positive integer.

Optionally, the first initial resource index is an index of a first initial resource in a second frequency band, the second initial resource index is an index of a second initial resource in the second frequency band, and the second frequency band is a frequency band including a resource corresponding to the second initial resource index to a resource corresponding to a result of subtracting 1 from the sum of the second initial resource index and the second configured bandwidth.

Optionally, the first initial resource index is an index of a first initial resource in a third frequency band, the second initial resource index is an index of a second initial resource in the third frequency band, the third frequency band includes a second frequency band, and the second frequency band is a frequency band including a resource corresponding to the second initial resource index to a resource corresponding to a result of subtracting 1 from the sum of the second initial resource index and the second configured bandwidth.

Optionally, the reference signal is a channel state information-reference signal.

It can be understood that for specific implementation of functional units included in the second communications device 800, reference may be made to the foregoing embodiments, and details are not described herein again.

Figure 15:
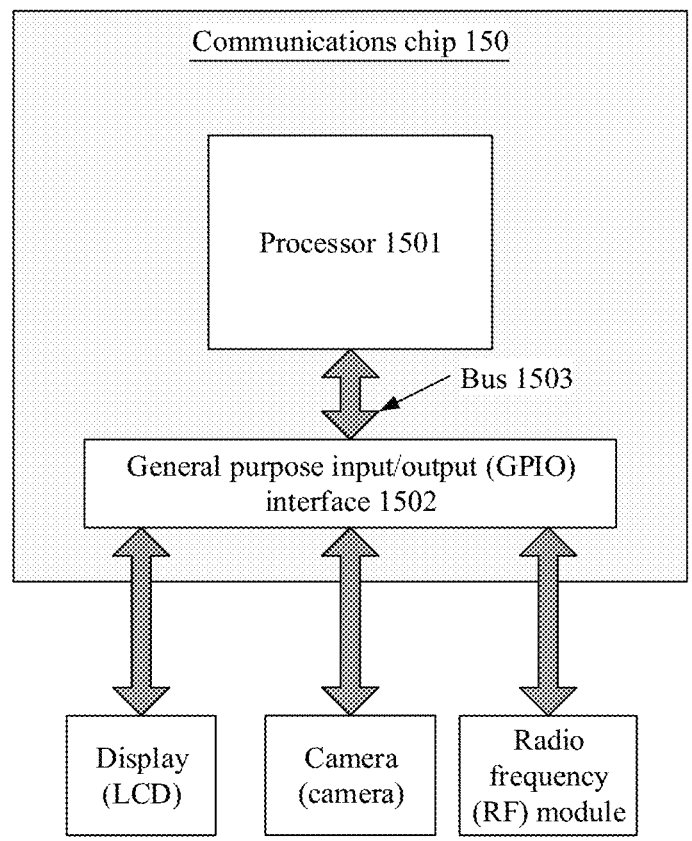
FIG. 15 is a schematic structural diagram of a communications chip according to an embodiment of this application.

FIG. 15 is a schematic structural diagram of a communications chip provided in this application. As shown in FIG. 15, the communications chip 150 may include a processor 1501 and one or more interfaces 1502 coupled to the processor 1501.

The processor 1501 may be configured to read and execute a computer readable instruction. In specific implementation, the processor 1501 may mainly include a controller, an operator, and a register. The controller is mainly responsible for instruction decoding, and sends a control signal for an operation corresponding to the instruction. The operator is mainly responsible for performing a fixed-point or floating-point arithmetic operation, a shift operation, a logic operation, and the like, and may also perform an address operation and conversion. The register is mainly responsible for saving a register operand, an intermediate operation result, and the like that need to be stored temporarily and that are generated in an instruction execution process. In specific implementation, a hardware architecture of the processor 1501 may be an application-specific integrated circuit (ASIC) architecture, a MIPS architecture, an ARM architecture, an NP architecture, or the like. The processor 1501 may be a single-core or multi-core processor.

The interface 1502 may be configured to input to-be-processed data to the processor 1501, and may output a processing result of the processor 1501 to the outside. In specific implementation, the interface 1502 may be a general purpose input/output (GPIO) interface, and may be connected to a plurality of peripheral devices (e.g., a display (LCD), a camera, and a radio frequency (RF) module). The interface 1502 is connected to the processor 1501 through a bus 1503.

In this application, the processor 1501 may be configured to invoke, from a memory, a program for implementing, on a communications device side, a reference signal transmission method provided in one or more embodiments of this application, and execute an instruction included in the program. The interface 1502 may be configured to output an execution result of the processor 1501. In this application, the interface 1502 may be specifically configured to output a resource allocation result of the processor 1501. For the reference signal transmission method provided in one or more embodiments of this application, refer to the foregoing embodiments, and details are not described herein again.

It should be noted that functions corresponding to the processor 1501 and the interface 1502 may be implemented through hardware design, software design, or a combination of software and hardware. This is not limited herein.

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer readable storage medium may be any usable medium accessible by a computer, or a data storage device, such as a server or a data center, including one or more usable media. The usable medium may be a magnetic medium (e.g., a floppy disk, a hard disk, or a magnetic tape), an optical medium (e.g., a DVD), a semiconductor medium (e.g., a solid-state drive (SSD)), or the like.

A person of ordinary skill in the art may understand that all or some of the processes of the methods in the embodiments may be implemented by a computer program instructing relevant hardware. The program may be stored in a computer readable storage medium. When the program is run, the processes of the methods in the embodiments are performed. The storage medium may be a magnetic disk, a compact disc, a read-only memory (ROM), a random access memory (RAM), or the like.

In the foregoing specific implementations, the objectives, technical solutions, and beneficial effects of the embodiments of this application are further described in detail. It should be understood that the foregoing descriptions are merely specific implementations of the embodiments of this application, but are not intended to limit the protection scope of the embodiments of this application. Any modification, equivalent replacement, or improvement made based on the technical solutions of the embodiments of this application shall fall within the protection scope of the embodiments of this application.

What is claimed is:

1. A communications device, comprising:
   at least one processor; and
   a transceiver:
   wherein the at least one processor is configured to carry out determining a first frequency band based on:
   a first initial resource index that is an index of an initial resource configured for transmission of a reference signal,
   a second initial resource index that is an index of an initial resource of a second frequency band,
   a first configured bandwidth that is configured for transmission of the reference signal, and
   a second configured bandwidth that is a size of the second frequency band,
   wherein the first initial resource index is greater than or equal to the second initial resource index, and
   wherein the first initial resource index is less than or equal to a sum of the second initial resource index and the second configured bandwidth; and
   wherein the transceiver is configured to receive the reference signal on the first frequency band.

2. The communications device according to claim 1, wherein during the determining, in accordance with a sum of the first initial resource index and the first configured bandwidth being greater than or equal to the sum of the second initial resource index and the second configured bandwidth, the processor determines the first frequency band according to the following:

a bandwidth of the first frequency band=the second initial resource index+the second configured bandwidth−the first initial resource index.

3. The communications device according to claim 1, wherein during the determining, in accordance with a sum of the first initial resource index and the first configured bandwidth being less than the sum of the second initial resource index and the second configured bandwidth, the processor determines a bandwidth of the first frequency band is equal to the first configured bandwidth.

4. The communications device according to claim 1, wherein:
   the first initial resource index is an index of a first initial resource in a third frequency band,
   the second initial resource index is an index of a second initial resource in the third frequency band,
   the third frequency band comprises the second frequency band, and
   the second frequency band is a frequency band comprising a resource corresponding to the second initial resource index to a resource corresponding to a result of subtracting 1 from the sum of the second initial resource index and the second configured bandwidth.

5. The communications device according to claim 4, wherein:
   the third frequency band is a full bandwidth, and
   the second frequency band is a bandwidth part (BWP).

6. The communications device according to claim 1, wherein the reference signal is a channel state information-reference signal.

7. A communications device, comprising:
at least one processor, and
a transceiver:
wherein the at least one processor is configured to carry out determining a first frequency band based on:
a first initial resource index that is an index of an initial resource configured for transmission of a reference signal,
a second initial resource index that is an index of an initial resource of a second frequency band,
a first configured bandwidth that is configured for transmission of the reference signal, and
a second configured bandwidth that is a size of the second frequency band,
wherein the first initial resource index is greater than or equal to the second initial resource index, and
wherein the first initial resource index is less than or equal to a sum of the second initial resource index and the second configured bandwidth; and
the transceiver is configured to send the reference signal on the first frequency band.

8. The communications device according to claim 7, wherein during the determining, in accordance with a sum of the first initial resource index and the first configured bandwidth being greater than or equal to the sum of the second initial resource index and the second configured bandwidth, the processor determines the first frequency band according to the following:

a bandwidth of the first frequency band=the second initial resource index+the second configured bandwidth−the first initial resource index.

9. The communications device according to claim 7, wherein during the determining, in accordance with a sum of the first initial resource index and the first configured bandwidth being less than the sum of the second initial resource index and the second configured bandwidth, the processor determines a bandwidth of the first frequency band is equal to the first configured bandwidth.

10. The communications device according to claim 7, wherein:
the first initial resource index is an index of a first initial resource in a third frequency band,
the second initial resource index is an index of a second initial resource in the third frequency band,
the third frequency band comprises the second frequency band, and
the second frequency band is a frequency band comprising a resource corresponding to the second initial resource index to a resource corresponding to a result of subtracting 1 from the sum of the second initial resource index and the second configured bandwidth.

11. The communications device according to claim 10, wherein the third frequency band is a full bandwidth, and the second frequency band is a bandwidth part (BWP).

12. The communications device according to claim 7, wherein the reference signal is a channel state information-reference signal.

13. A method, carried out by a first communications device, the method comprising:
determining a first frequency band based on:
a first initial resource index that is an index of an initial resource configured for transmission of a reference signal,
a second initial resource index that is an index of an initial resource of a second frequency band,
a first configured bandwidth that is configured for transmission of the reference signal, and
a second configured bandwidth that is a size of the second frequency band,
wherein the first initial resource index is greater than or equal to the second initial resource index, and
wherein the first initial resource index is less than or equal to a sum of the second initial resource index and the second configured bandwidth; and
receiving the reference signal on the first frequency band.

14. The method according to claim 13, wherein during the determining, in accordance with a sum of the first initial resource index and the first configured bandwidth being greater than or equal to the sum of the second initial resource index and the second configured bandwidth, determining the first frequency band according to the following:

a bandwidth of the first frequency band=the second initial resource index+the second configured bandwidth−the first initial resource index.

15. The method according to claim 13, wherein during the determining, in accordance with a sum of the first initial resource index and the first configured bandwidth being less than the sum of the second initial resource index and the second configured bandwidth, determining a bandwidth of the first frequency band is equal to the first configured bandwidth.

16. The method according to claim 13, wherein:
the first initial resource index is an index of a first initial resource in a third frequency band,
the second initial resource index is an index of a second initial resource in the third frequency band,
the third frequency band comprises the second frequency band, and
the second frequency band is a frequency band comprising a resource corresponding to the second initial resource index to a resource corresponding to a result of subtracting 1 from the sum of the second initial resource index and the second configured bandwidth.

17. The method according to claim 16, wherein the third frequency band is a full bandwidth, and the second frequency band is a bandwidth part (BWP).

18. The method according to claim 13, wherein the reference signal is a channel state information-reference signal.

19. A method, comprising:
determining, by a second communications device, a first frequency band based on:
a first initial resource index that is an index of an initial resource configured for transmission of a reference signal,
a second initial resource index that is an index of an initial resource of a second frequency band,
a first configured bandwidth that is configured for transmission of the reference signal, and
a second configured bandwidth that is a size of the second frequency band,
wherein the first initial resource index is greater than or equal to the second initial resource index, and
wherein the first initial resource index is less than or equal to a sum of the second initial resource index and the second configured bandwidth; and
sending, by the second communications device, the reference signal on the first frequency band.

20. The method according to claim 19, wherein during the determining, in accordance with a sum of the first initial resource index and the first configured bandwidth being greater than or equal to the sum of the second initial resource index and the second configured bandwidth, determining the first frequency band according to the following:

$$\text{a bandwidth of the first frequency band} = \text{the second initial resource index} + \text{the second configured bandwidth} - \text{the first initial resource index}.$$

21. The method according to claim 19, wherein during the determining, in accordance with a sum of the first initial resource index and the first configured bandwidth being less than the sum of the second initial resource index and the second configured bandwidth, determining a bandwidth of the first frequency band is equal to the first configured bandwidth.

22. The method according to claim 19, wherein:
   the first initial resource index is an index of a first initial resource in a third frequency band,
   the second initial resource index is an index of a second initial resource in the third frequency band,
   the third frequency band comprises the second frequency band, and
   the second frequency band is a frequency band comprising a resource corresponding to the second initial resource index to a resource corresponding to a result of subtracting 1 from the sum of the second initial resource index and the second configured bandwidth.

23. The method according to claim 22, wherein the third frequency band is a full bandwidth, and the second frequency band is a bandwidth part (BWP).

24. The method according to claim 19, wherein the reference signal is a channel state information-reference signal.

* * * * *